(12) United States Patent
Takaoki

(10) Patent No.: US 7,220,805 B2
(45) Date of Patent: May 22, 2007

(54) PROCESS FOR PRODUCING CONTACT PRODUCT; CATALYST COMPONENT FOR ADDITION POLYMERIZATION; PROCESS FOR PRODUCING CATALYST FOR ADDITION POLYMERIZATION; AND PROCESS FOR PRODUCING ADDITION POLYMER

(75) Inventor: Kazuo Takaoki, Albany, CA (US)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/033,387

(22) Filed: Jan. 12, 2005

(65) Prior Publication Data

US 2005/0256282 A1 Nov. 17, 2005

(30) Foreign Application Priority Data

May 13, 2004 (JP) ............................. 2004-143341

(51) Int. Cl.
C08F 4/74 (2006.01)
C08F 4/60 (2006.01)
C08F 4/76 (2006.01)

(52) U.S. Cl. ...................... 526/113; 526/114; 526/115; 526/116; 526/117; 526/172; 526/161; 526/170; 526/160; 502/113; 502/129; 502/122; 502/123; 502/125

(58) Field of Classification Search ................ 526/172, 526/173, 161, 113, 114, 115, 116, 117; 502/113, 502/129, 122, 123, 125
See application file for complete search history.

(56) References Cited

U.S. PATENT DOCUMENTS

| 3,287,334 | A | | 11/1966 | Kropa | |
|---|---|---|---|---|---|
| 3,544,473 | A | * | 12/1970 | Kitchen et al. | 252/187.25 |
| 3,647,496 | A | * | 3/1972 | Bagai et al. | 106/411 |
| 4,542,199 | A | | 9/1985 | Kaminsky et al. | |
| 4,654,417 | A | * | 3/1987 | Inoue et al. | 528/416 |
| 4,774,356 | A | * | 9/1988 | Inoue et al. | 560/224 |
| 4,904,745 | A | * | 2/1990 | Inoue et al. | 525/404 |
| 5,153,157 | A | | 10/1992 | Hlatky et al. | |
| 5,312,871 | A | * | 5/1994 | Mardare et al. | 525/272 |
| 5,560,858 | A | * | 10/1996 | Fredj et al. | 510/320 |
| 5,708,102 | A | * | 1/1998 | Fryd et al. | 526/172 |
| 5,919,983 | A | | 7/1999 | Rosen et al. | |
| 6,028,025 | A | * | 2/2000 | Ying et al. | 502/171 |
| 6,395,671 | B2 | | 5/2002 | LaPointe | |
| 6,602,960 | B1 | * | 8/2003 | Harwood et al. | 525/292 |
| 6,852,809 | B2 | * | 2/2005 | Takaoki et al. | 526/90 |
| 7,022,420 | B1 | * | 4/2006 | Bruno et al. | 428/681 |
| 7,084,219 | B2 | * | 8/2006 | Takaoki | 526/148 |
| 2001/0041775 | A1 | | 11/2001 | Takaoki et al. | |

FOREIGN PATENT DOCUMENTS

| EP | 1 113 025 A2 * | 7/2001 |
|---|---|---|
| EP | 0 683 184 B1 | 6/2002 |
| JP | 2002-338573 * | 11/2002 |

OTHER PUBLICATIONS

Wayland et al. J. Am. Chem. Soc., 1994, 116, 7943-7944.*
Allemann et al. Int. J. Canc. 1996, 66, 821-824.*
Cremophor EL product brochure (BASF), Jul. 1997.*
G.S. Long et al., "Transition Metal Phthalocyanine and Porphyrin Complexes as Catalysts for the Polymerization of Olefins", Polymer Preprints, vol. 40, No. 2, 1999, pp. 843-844.
H. Sugimoto et al., "Accelerated Living Polymerization of Methacrylonitrile with Aluminum Porphyrin Initiators by Activation of Monomer or Growing Species. Controlled Synthesis and Properties of poly(methyl methacrylate-b-methacrylonitrile)s", Macromolecules, vol. 29, 1996, pp. 3359-3369.

* cited by examiner

Primary Examiner—David W. Wu
Assistant Examiner—Rip A. Lee
(74) Attorney, Agent, or Firm—Sughrue Mion, PLLC

(57) ABSTRACT

There are provided (1) a process for producing a contact product, which comprises the step of contacting at least a phthalocyanine complex, a porphyrin complex, or their combination with a surfactant; (2) a catalyst component for addition polymerization, which comprises said contact product; (3) a process for producing a catalyst for addition polymerization, which comprises the step of contacting said catalyst component, a compound of a metal atom of Groups 3 to 12 or the lanthanide series, and an optional organoaluminum compound with one another; and (4) a process for producing an addition polymer, which comprises the step of polymerizing an addition polymerizable monomer in the presence of said catalyst.

4 Claims, No Drawings

PROCESS FOR PRODUCING CONTACT PRODUCT; CATALYST COMPONENT FOR ADDITION POLYMERIZATION; PROCESS FOR PRODUCING CATALYST FOR ADDITION POLYMERIZATION; AND PROCESS FOR PRODUCING ADDITION POLYMER

FIELD OF THE INVENTION

The present invention relates to a process for producing a contact product; a catalyst component for addition polymerization, which comprises said contact product; a process for producing a catalyst for addition polymerization using said catalyst component; and a process for producing an addition polymer using said catalyst.

BACKGROUND OF THE INVENTION

There are known the following so-called single-site catalysts, which are used for producing an olefin polymer such as polypropylene and polyethylene:

(1) a catalyst obtained by contacting a catalyst component, which comprises a metallocene complex such as a metallocene complex and a half-metallocene complex, with a co-catalyst component for activation such as an aluminoxane and tri(n-butyl)ammonium tetrakis(pentafluorophenyl)borate (JP 58-19309A, corresponding to U.S. Pat. No. 4,542,199, and JP 1-502036W, corresponding to EP 277004A); and (2) a catalyst obtained by contacting with one other a metallocene complex, triisobutylaluminum, and cobalt hexadecafluorophthalocyanine as a co-catalyst component for activation (JP 2001-247611A, corresponding to EP 1113025A).

SUMMARY OF THE INVENTION

However, each of the above-mentioned catalysts has a problem in that its polymerization activity per unit amount of a co-catalyst component for activation is insufficient in addition polymerization of an olefin.

In view of said problem, an object of the present invention is to provide (1) a process for producing a contact product, which can be used as a catalyst component for addition polymerization having an excellent polymerization activity, (2) a catalyst component for addition polymerization, which comprises a contact product produced by said process, (3) a process for producing a catalyst for addition polymerization using said catalyst component for addition polymerization, and (4) a process for producing an addition polymer using said catalyst for addition polymerization.

The present invention is a process for producing a contact product, which comprises the step of contacting at least a phthalocyanine complex, a porphyrin complex, or their combination with a surfactant.

Also, the present invention is a catalyst component for addition polymerization, which comprises a contact product produced by the above-mentioned process for producing a contact product.

Further, the present invention is a process for producing a catalyst for addition polymerization, which comprises the step of contacting the above-mentioned catalyst component for addition polymerization, a compound of a metal atom of Groups 3 to 12 or the lanthanide series, and an optional organoaluminum compound with one another.

Still further, the present invention is a process for producing an addition polymer, which comprises the step of addition polymerizing an addition polymerizable monomer in the presence of a catalyst for addition polymerization produced by the above-mentioned process for producing a catalyst for addition polymerization.

In the present invention, the term "contact product" means a product obtained by contacting two or more starting materials with one another; and the above-mentioned "contact product", "compound of a metal atom of Groups 3 to 12 or the lanthanide series", and "organoaluminum compound" are herein after referred to as "component (A)", "component (B)" and "component (C)", respectively.

DETAILED DESCRIPTION OF THE INVENTION

In the present invention, the above-mentioned "phthalocyanine complex" means a complex between phthalocyanine and a metal, or a complex between a phthalocyanine derivative and a metal; and the above-mentioned "porphyrin complex" means a complex between porphyrin and a metal, or a complex between a porphyrin derivative and a metal.

Preferred is a complex represented by the following formula [2]:

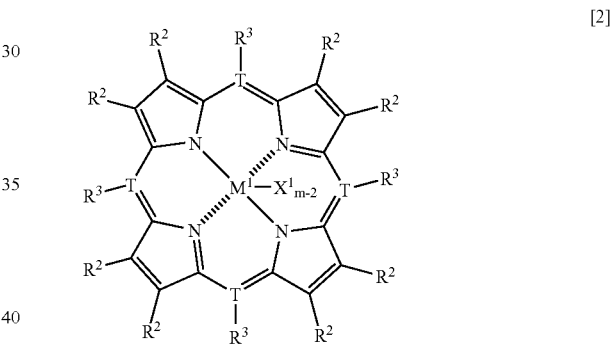

wherein $M^1$ is an atom of Groups 2 to 12 or the lanthanide series of the periodic table (IUPAC Inorganic Chemistry Nomenclature revised in 1989); all Ts are carbon or nitrogen atoms, and preferably are nitrogen atoms; $R^2$ is a hydrogen atom, a halogen atom or a hydrocarbon group; respective $R^2$s are the same as, or different from one another, and may be linked to one another to form a ring; $R^3$ is a hydrogen atom, a halogen atom or a hydrocarbon group independently of $R^2$; respective $R^3$s are the same as, or different from one another; when T is a nitrogen atom, all $R^3$s do not exist; m is the valence of $M^1$, and is preferably 2; $X^1$ is a hydrogen atom, a halogen atom, a hydrocarbon group or a hydrocarbyloxy group; and when plural $X^1$s exist, they are the same as, or different from one another.

Examples of $M^1$ in the formula [2] are a scandium atom, an yttrium atom, a titanium atom, a zirconium atom, a vanadium atom, a chromium atom, a molybdenum atom, a manganese atom, a rhenium atom, an iron atom, a ruthenium atom, a cobalt atom, a rhodium atom, a nickel atom, a palladium atom, a platinum atom, a copper atom, a silver atom, a gold atom, a zinc atom, a cadmium atom, a mercury atom, a samarium atom and an ytterbium atom. Among them, preferred is an atom of Group 9 or 12, and particularly preferred is a cobalt atom or a zinc atom.

Examples of the halogen atom of $R^2$ and $R^3$ in the formula [2] are a fluorine atom, a chlorine atom, a bromine atom and an iodine atom. Among them, preferred is a fluorine atom.

The hydrocarbon group of $R^2$ and $R^3$ in the formula [2] is preferably an alkyl group, an aryl group or an aralkyl group.

Examples of said alkyl group are a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group and a n-eicosyl group.

One or more hydrogen atoms contained in the above-mentioned alkyl groups may be substituted with a halogen atom such as a fluorine atom, a chlorine atom, a bromine atom and an iodine atom. Examples of an alkyl group, whose one or more hydrogen atoms are substituted with a halogen atom, are a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, and a 1,1-bis(triiodomethyl)-2,2,2-triiodoethyl group.

An alkyl group of $R^2$ and $R^3$ in the formula [2] is preferably an alkyl group having 1 to 20 carbon atoms; and more preferably a methyl group, an ethyl group, an isopropyl group, a tert-butyl group, an isobutyl group, a halogenated methyl group, a halogenated ethyl group, a halogenated isopropyl group, a halogenated tert-butyl group, or a halogenated isobutyl group.

Examples of the aryl group of $R^2$ and $R^3$ in the formula [2] are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group.

One or more hydrogen atoms contained in the above-mentioned aryl groups may be substituted with a halogen atom such as a fluorine atom, a chlorine atom, a bromine atom and an iodine atom. Examples of an aryl group, whose one or more hydrogen atoms are substituted with a halogen atom, are a 2-fluropheny group, a 3-fluorophenyl group, a 4-fluorophenyl group, a 2-chlorophenyl group, a 3-chlorophenyl group, a 4-chlorophenyl group, a 2-bromophenyl group, a 3-bromophenyl group, a 4-bromophenyl group, a 2-iodophenyl group, a 3-iodophenyl group, a 4-iodophenyl group, a 2,6-difluorophenyl group, a 3,5-difluorophenyl group, a 2,6-dichlorophenyl group, a 3,5-dichlorophenyl group, a 2,6-dibromophenyl group, a 3,5-dibromophenyl group, a 2,6-diiodophenyl group, a 3,5-diiodophenyl group, a 2,4,6-trifluorophenyl group, a 2,4,6-trichlorophenyl group, a 2,4,6-tribromophenyl group, a 2,4,6-triiodophenyl group, a pentafluorophenyl group, a pentachlorophenyl group, a pentabromophenyl group, a penta-iodophenyl group, a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group and a 2,4,6-tris(trifluoromethyl)phenyl group.

An aryl group of $R^2$ and $R^3$ in the formula [2] is preferably an aryl group having 6 to 20 carbon atoms; and more preferably a phenyl group or a halogenated phenyl group.

Examples of the aralkyl group of $R^2$ and $R^3$ in the formula [2] are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-tetradecylphenyl)methyl group, a naphthylmethyl group and an anthracenylmethyl group.

One or more hydrogen atoms contained in the above-mentioned aralkyl groups may be substituted with a halogen atom such as a fluorine atom, a chlorine atom, a bromine atom and an iodine atom.

An aralkyl group of $R^2$ and $R^3$ in the formula [2] is preferably an aralkyl group having 7 to 20 carbon atoms; and more preferably a benzyl group or a halogenated benzyl group.

Examples of the ring formed by linking of two or more $R^2$s in the formula [2] are those represented by the following formulas (2-1) to (2-4):

(2-1)

(2-2)

(2-3)

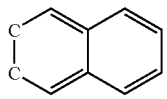

wherein two R²s are linked to each other. These rings may have a substituent such as a halogen atom and a hydrocarbon group.

At least one of $R^2$ and $R^3$ in the formula [2] is preferably a halogen atom or a halogenated hydrocarbon group.

Examples of the halogen atom of $X^1$ in the formula [2] are a fluorine atom, a chlorine atom, a bromine atom and an iodine atom. Among them, preferred is a fluorine atom and a chlorine atom.

A hydrocarbon group of $X^1$ in the formula [2] is preferably an alkyl group, an aryl group or an aralkyl group.

Said alkyl group is preferably an alkyl group having 1 to 20 carbon atoms. Examples thereof are a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group and a n-eicosyl group. Among them, more preferred is a methyl group, an ethyl group, an isopropyl group, a tert-butyl group or an isobutyl group.

The above-mentioned aryl group of $X^1$ in the formula [2] is preferably an ary group having 6 to 20 carbon atoms. Examples thereof are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, a phenyl group is more preferable.

The above-mentioned aralkyl group of $X^1$ in the formula [2] is preferably an aralkyl group having 7 to 20 carbon atoms. Examples thereof are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-tetradecylphenyl)methyl group, a naphthylmethyl group and an anthracenylmethyl group. Among them, a benzyl group is more preferable.

The hydrocarbyloxy group of $X^1$ in the formula [2] is preferably an alkoxy group, an aryloxy group or an aralkyloxy group.

Said alkoxy group is preferably an alkoxy group having 1 to 24 carbon atoms. Examples thereof are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicosoxy group. Among them, preferred is a methoxy group, an ethoxy group or a tert-butoxy group; and more preferred is a methoxy group.

The above-mentioned aryloxy group of $X^1$ in the formula [2] is preferably an aryloxy group having 6 to 24 carbon atoms. Examples thereof are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group. Among them, preferred is a phenoxy group.

The above-mentioned aralkyloxy group of $X^1$ in the formula [2] is preferably an aralkyloxy group having 7 to 24 carbon atoms. Examples thereof are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group and an anthracenylmethoxy group. Among them, preferred is a benzyloxy group.

$X^1$ in the formula [2] is preferably a fluorine atom, a chlorine atom, a methoxy group or a phenoxy group; more preferably a fluorine atom or a chlorine atom; and further preferably a fluorine atom.

Examples of the complex in the present invention are those represented by the respective formulas contained in the group (I) consisting of the following six formulas:

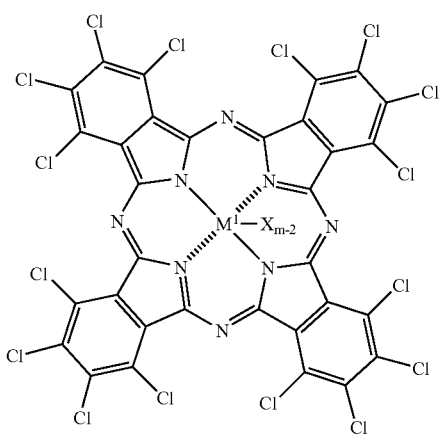
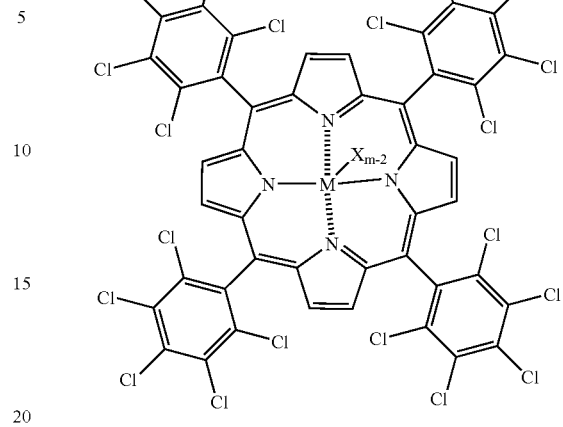
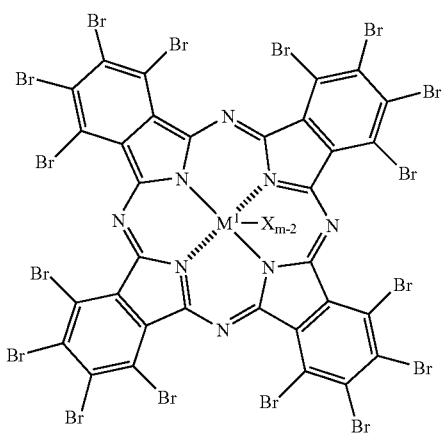
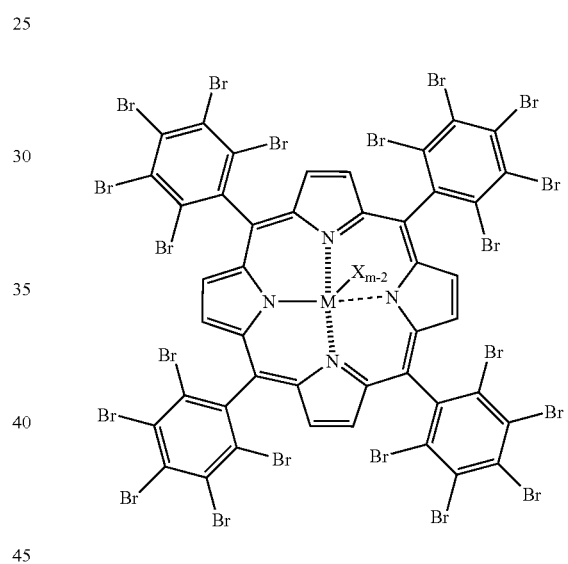
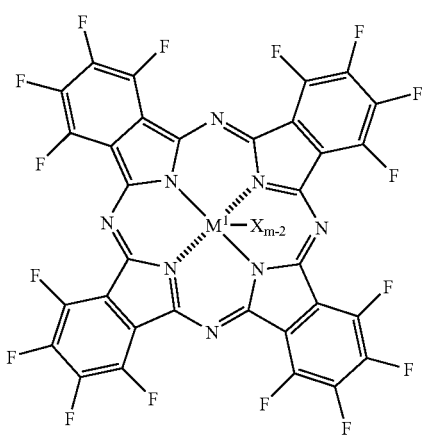
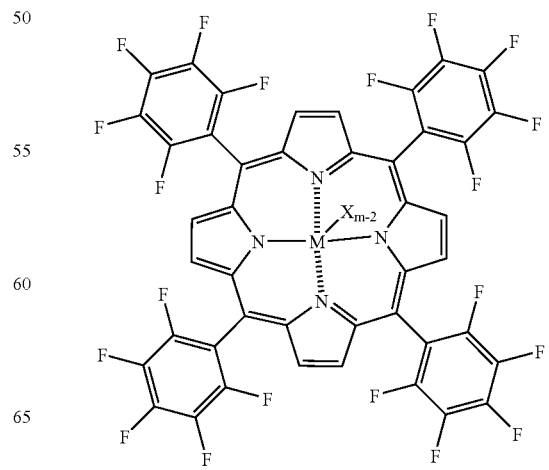

wherein M is a scandium atom, an yttrium atom, a titanium atom, a zirconium atom, a vanadium atom, a chromium atom, a molybdenum atom, a manganese atom, a rhenium atom, an iron atom, a ruthenium atom, a cobalt atom, a rhodium atom, a nickel atom, a palladium atom, a platinum atom, a copper atom, a silver atom, a gold atom, a zinc atom, a cadmium atom, a mercury atom, a samarium atom or an ytterbium atom; X is a fluorine atom, a chlorine atom, a bromine atom, an iodine atom, a methoxy group, an ethoxy group, a tert-butoxy group or a phenoxy group; and m is 2, 3 or 4.

Specific examples of the complex contained in the above-mentioned group (I) are (1) a complex whose m is 2, and M is any atom of the above-exemplified atoms, and (2) a complex whose m is 3, X is a fluorine atom, a chlorine atom or a bromine atom, and M is any atom of the above-exemplified atoms.

The complex contained in the above-mentioned group (I) is preferably a complex whose m is 2 or 3, M is a scandium atom, a titanium atom, a vanadium atom, a chromium atom, a manganese atom, an iron atom, a cobalt atom, a nickel atom, a copper atom, a zinc atom or a samarium atom, and X is a fluorine atom, a chlorine atom, a methoxy group or a phenoxy group; more preferably a complex whose m is 2, and M is a scandium atom, a titanium atom, a vanadium atom, a chromium atom, a manganese atom, an iron atom, a cobalt atom, a nickel atom, a copper atom, a zinc atom or a samarium atom; further preferably a complex whose m is 2, and M is a chromium atom, a manganese atom, an iron atom, a cobalt atom, a nickel atom, a zinc atom or a samarium atom; and particularly preferably a complex whose m is 2, and M is a cobalt atom or a zinc atom.

The complex in the present invention is preferably a complex represented by the following formula [3]:

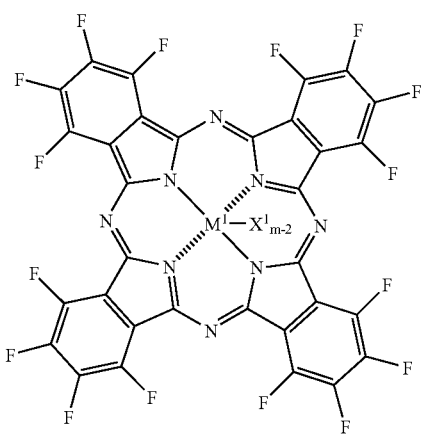

[3]

wherein $M^1$ is an atom of Groups 2 to 12 or the lanthanide series of the periodic table (IUPAC Inorganic Chemistry Nomenclature revised in 1989); m is the valence of $M^1$, and preferably 2; and $X^1$ is a hydrogen atom, a halogen atom, a hydrocarbon group or a hydrocarbyloxy group, and when plural $X^1$s exist, they are the same as, or different from one another.

Examples of $M^1$ in the above formula [3] are those exemplified above as $M^1$ in the above formula [2]. Among them, preferred is an atom of Group 9 or 12, and particularly preferred is a cobalt atom or a zinc atom. Specific examples of $X^1$, and preferable examples thereof in the above formula [3] are the same as those of $X^1$ in the above formula [2], respectively.

The complex represented by the above formula [2] can be produced according to a process known in the art. An example of the process is that mentioned in Inorganic Chemistry, 19, 3131–3135 (1980). Said complex may be a commercially available one.

Examples of the surfactant in the present invention are a nonionic surfactant, a cationic surfactant and an anionic surfactant.

Examples of the nonionic surfactant are a primary amine such as dodecylamine, octadecylamine, cocoa-alkylamine, hydrogenated rapeseed-alkylamine, hydrogenated beef tallow-alkylamine, oleylamine, rapeseed-alkylamine, soybean-alkylamine and beef tallow-alkylamine; a secondary amine such as dicocoa-alkylamine and di(hydrogenated beef tallow-alkyl)amine; a tertiary amine such as tridecylamine, trihexadecylamine, dodecyldimethlyamine, hexadecyldimethlyamine, dimethyloctadecylyamine, cocoa-alkyldimethylamine, hydrogenated beef tallow-alkyldimethylamine, dimethyloleylamine, soybean-alkyldimethylamine, beef tallow-alkyldimethylamine, didodecylmethylamine, dihexadecylmethylamine, methyldioctadecylamine, di(cocoa-alkyl)methylamine, di(hydrogenated beef tallow-alkyl)methylamine, methyldioleylamine, di(soybean-alkyl)methylamine and di(beef tallow-alkyl)methylamine; a diamine such as N-cocoa-alkyl-1,3-diaminopropane, N-oleyl-1,3-diaminopropane, N-soybean-alkyl-1,3-diaminopropane and N-beef tallow-alkyl-1,3-diaminopropane; a triamine such as N-beef tallow-alkyldipropylenetriamine; a tetraamine such as N-beef tallow-alkyltripropylenetetraamine; a fatty amine-ethylene oxide adduct (ETHOMEEN, which is a trademark of Akzo Nobel): a fatty acid-ethylene oxide adduct (ETHOFAT, which is a trademark of Akzo Nobel); and an aliphatic amide-alkylene oxide adduct (ETHOMID, which is a trademark of Akzo Nobel).

Examples of the above-mentioned cationic surfactant are tetraalkylammonium salt (ARQUAD, which is a trademark of Akzo Nobel); an alkyltrimethylammonium salt such as dodecyltrimethylammonium salt, hexadecyltrimethylammonium salt, octadecyltrimethylammonium salt, cocoa-alkyltrimethylammonium salt, soybean-alkyltrimethylammonium salt and beef tallow-alkyltrimethylammonium salt; a dialkyldimethylammonium salt such as dicocoa-alkyldimethylammonium salt and di(hydrogenated beef tallow-alkyl)dimethylammonium salt; a trialkylmethylammonium salt such as trihexadecylmethylammonium salt; a benzyldimethylalkylammonium salt such benzyldimethylcocoa-alkylammonium salt and benzyldimethyl(hydrogenated beef tallow-alkyl)ammonium salt; a benzylmethyldialkylammonium salt such as benzylmethyldi(hydrogenated beef tallow-alkyl)ammonium salt; and polyoxyethylenealkylmethylammonium salt (ETHOQUAD, which is a trademark of Akzo Nobel).

Examples of the above-mentioned anionic surfactant are a salt of a long-chain aliphatic carboxylic acid such as a sodium salt or a potassium salt of a fatty acid (for example, stearic acid; oleic acid; palmitic acid; lauric acid; and a fatty acid obtained from fat and oil such as coconut oil, soybean oil and tallow oil); a salt of a sulfonic acid such as a sodium salt or a potassium salt of a sulfonic acid having a long-chain alkyl group (for example, a dodecyl group, a cetyl group, a stearyl group, an oleyl group, a palmityl group and a lauryl group); and a salt of a benzene sulfonic acid such as a sodium salt or a potassium salt of a benzene sulfonic acid having a long-chain alkyl group (for example, the above-mentioned groups).

As the surfactant, preferred is a compound represented by the following formula [1]:

$$ZR^1_n \qquad [1]$$

wherein Z is a nitrogen atom, an oxygen atom or a sulfur atom, and preferred is a nitrogen atom or an oxygen atom, and more preferred is a nitrogen atom; n is the valence of Z, and when Z is a nitrogen atom, n is 3, when Z is an oxygen atom, n is 2, and when Z is a sulfur atom, n is generally 2; and $R^1$ is a hydrogen atom or a hydrocarbon group, and plural $R^1$s are the same as, or different from one another.

$R^1$ in the formula [1] is preferably a hydrocarbon group. Said hydrocarbon group is preferably a chain hydrocarbon group, and more preferably an alkyl group or an alkenyl group.

Said alkyl group is preferably an alkyl group having 1 to 100 carbon atoms. Examples thereof are a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a 2-ethylhexy group, a n-octyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosyl group, a n-docosyl group, a 2-(3-methylhexy)-7-methydecyl group and a long-chain alky group derived from a natural product (for example, coconut oil, soybean oil and beef tallow).

The above-mentioned an alkenyl group of $R^1$ in the formula [1] is preferably an alkenyl group having 1 to 100 carbon atoms. Examples thereof are a 9-cis-octadecenyl group; and a long-chain alkenyl group derived from a natural product such as coconut oil, soybean oil and beef tallow.

One or more hydrogen atoms contained in the above-mentioned alkyl groups and alkenyl groups of $R^1$ may be substituted with a halogen atom such as a fluorine atom, a chlorine atom, a bromine atom and an iodine atom.

In the formula [1], it is preferable that at least one $R^1$ is a hydrocarbon group having 12 to 100 carbon atoms; and it is more preferable that two or more $R^1$s are hydrocarbon groups having 12 to 100 carbon atoms. Said hydrocarbon group having 12 to 100 carbon atoms is preferably an alkyl group having 12 to 100 carbon atoms; more preferably a n-dodecyl group, a n-tetradecyl group, a n-hexadecyl group, a n-octadecyl group, a n-eicosyl group, a n-docosyl group, a 2-(3-methylhexyl)-7-methyldecyl group, or a long-chain alkyl group derived from a natural product such as coconut oil, soybean oil and beef tallow; further preferably a n-octadecyl group, a n-eicosyl group, a n-docosyl group, a 2-(3-methylhexyl)-7-methyldecyl group, or a long-chain alkyl group derived from a natural product such as coconut oil, soybean oil and beef tallow; and particularly preferably a n-octadecyl group.

Examples of a compound represented by the formula [1] are octadecylamine, eicosylamine, docosylamine, 2-(3-methylhexyl)-7-methyldecylamine, dioctadecylamine, methyloctadecylamine and methyldioctadecylamine. Among them, preferred is methyldioctadecylamine.

A temperature for contacting the complex with the surfactant in the process for producing the component (A) of the present invention is generally −100 to 200° C., preferably −50 to 180° C., further preferably −10 to 170° C., and most preferably 10 to 150° C. A time therefor is generally 1 minute to 240 hours, preferably 10 minute to 120 hours, further preferably 30 minute to 60 hours, and most preferably 1 to 48 hours.

The above-mentioned contacting is carried out in a solvent, generally under an atmosphere of an inert gas free from moisture and oxygen. Said solvent is inert to the complex and surfactant, and is a non-polar solvent such as an aliphatic hydrocarbon solvent and an aromatic hydrocarbon solvent, or a polar solvent such as an ether solvent. Examples thereof are butane, hexane, heptane, octane, decane, 2,2,4-trimethylpentane, cyclohexane, benzene, toluene, xylene, dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran and tetrahydropyran. Among them, preferred is a polar solvent; more preferred is dimethyl ether, diethyl ether, diisopropyl ether, di-n-butyl ether, methyl-tert-butyl ether, anisole, 1,4-dioxane, 1,2-dimethoxyethane, bis(2-methoxyethyl)ether, tetrahydrofuran or tetrahydropyran; further preferred is diethyl ether, di-n-butyl ether, methyl-tert-butyl ether, anisole, 1,4-dioxane or tetrahydrofuran; and most preferred is tetrahydrofuran.

The surfactant is used in an amount of 0.01 to 10 mol, more preferably 0.1 to 5 mol, further preferably 0.2 to 3 mol, and most preferably 0.3 to 2 mol. per 1 mol of the complex.

The component (A) produced by the process according to the present invention may contain the complex or the surfactant remaining unreacted.

Each of the complex and the surfactant in the present invention may be used in combination with other compound such as an imidazole compound, for example, imidazole, 2-undecylimidazole, 2-heptadecylimidazole, 4,5-bis(undecyl)imidazole and 4,5-bis(heptadecyl)imidazole.

When the above-mentioned solvent deactivates a catalyst for addition polymerization produced by the process according to the present invention, such a solvent contained in the component (A) is preferably removed. Particularly, when the above-mentioned polar solvent is used, it is preferable to (1) separate the component (A) from said polar solvent, and then, (2) dry the separated component (A) (2–1) under a reduced pressure at preferably 0 to 100° C., more preferably 10 to 80° C., and further preferably 20 to 60° C., or (2-2) by passing an inert gas such as nitrogen and argon through the component (A), in order to improve a polymerization activity of a catalyst for addition polymerization. Examples of a method for the above-mentioned separation of the component (A) from the said polar solvent are a distillation method; a distillation method under a reduced pressure; an evaporation method; and a method comprising the steps of (i) adding a non-polar solvent to a mixture obtained by contacting the complex with the surfactant to precipitate the component (A), and then, (ii) separating the precipitate by filtration.

A more specific example of the process for producing the component (A) of the present invention, wherein the complex is cobalt hexadecafluorophthalocyanine, and the surfactant is methyldioctadecylamine, is a process comprising the steps of:

(1) putting cobalt hexadecafluorophthalocyanine, an equimolecular amount of methyldioctadecylamine, and tetrahydrofuran into a flask purged with argon in this order, (2) stirring the resultant mixture under refluxing for 24 hours, and (3) removing tetrahydrofuran contained in the reaction mixture by distillation under a reduced pressure at a room temperature.

The component (A) is suitably used as a catalyst component for addition polymerization. In a process for producing a catalyst for addition polymerization of the present invention, it is preferable to use the component (C).

Examples of the component (B) are a metal compound represented by the following formula [4], and its μ-oxo type metal compound:

$$L_aM^2X^2_b \qquad [4]$$

wherein L is a cyclopentadiene-containing anionic group or a hetero atom-containing group, and when plural L³s exist, they are the same as, or different from one another, and are connected directly to one another or through a residual group containing a carbon atom, a silicon atom, a nitrogen atom, an oxygen atom, a sulfur atom or a phosphorus atom; a is an integer satisfying 0<a≦8, and depending upon the valence of the below-mentioned $M^2$; $M^2$ is a metal atom of Groups 3 to 12 or the lanthanide series of the periodic table (IUPAC Inorganic Chemistry Nomenclature revised in 1989); $X^2$ is a halogen atom, a hydrocarbon group (excluding the above-mentioned cyclopentadiene-containing anionic group) or a hydrocarbyloxy group, and when plural $X^2$s exist, they are the same as, or different from one another; and b is an integer satisfying 0<b≦8, depending upon the valence of $M^2$. The above-mentioned "cyclopentadiene-containing anionic group" means a group having a cyclopentadienyl type anion skeleton.

Examples of $M^2$ in the formula [4] are a scandium atom, an yttrium atom, a titanium atom, a zirconium atom, a hafnium atom, a vanadium atom, a niobium atom, a tantalum atom, a chromium atom, a molybdenum atom, a tungsten atom, a manganese atom, a technetium atom, an iron atom, a ruthenium atom, a cobalt atom, a rhodium atom, a nickel atom, a palladium atom, a samarium, atom and an ytterbium atom. Among them, preferred is a metal atom of Groups 3 to 11 of the periodic table; more preferred is a metal atom of Groups 3 to 8, 10 and 11 thereof; further preferred is a metal atom of Groups 3 to 8 thereof; and particularly preferred is a titanium atom, a zirconium atom or a hafnium atom.

Examples of the above-mentioned cyclopentadiene-containing anionic group of L in the formula [4] are an η⁵-(substituted)cyclopentadienyl group, an η⁵-(substituted)indenyl group, and an η⁵-(substituted)fluorenyl groups. Specific examples thereof are an η⁵-cyclopentadienyl group, an η⁵-methylcyclopentadienyl group, an η⁵-tert-butylcyclopentadienyl group, an η⁵-1,2-dimethylcyclopentadienyl group, an η⁵-1,3-dimethylcyclopentadienyl group, an η⁵-1-tert-butyl-2-methylcyclopentadienyl group, an η⁵-1-tert-butyl-3-methylcyclopentadienyl group, an η⁵-1-methyl-2-isopropylcyclopentadienyl group, an η⁵-1-methyl-3-isopropylcyclopentadienyl group, an η⁵-2,3-trimethylcyclopentadienyl group, an η⁵-1,2,4-trimethylcyclopentadienyl group, an η⁵-tetramethylcyclopentadienyl group, an η⁵-pentamethylcyclopentadienyl group, an η⁵-indenyl group, an η⁵-4,5,6,7-tetrahydroindenyl group, an η⁵-2-methylindenyl group, an η⁵-3-methylindenyl group, an η⁵-4-methylindenyl group, an η⁵-5-methylindenyl group, an η⁵-6-methylindenyl group, an η⁵-7-methylindenyl group, an η⁵-2-tert-butylindenyl group, an η⁵-3-tert-butylindenyl group, an η⁵-4-tert-butylindenyl group, an η⁵-5-tert-butylindenyl group, an η⁵-6-tert-butylindenyl group, an η⁵-7-tert-butylindenyl group, an η⁵-2,3-dimethylindenyl group, an η⁵-4,7-dimethylindenyl group, an η⁵-2,4,7-trimethylindenyl group, an η⁵-2-methyl-4-isopropylindenyl group, an η⁵-4,5-benzindenyl group, an η⁵-2-methyl-4,5-benzindenyl group, an η⁵-4-phenylindenyl group, an η⁵-2-methyl-5-phenylindenyl group, an η⁵-2-methyl-4-phenylindenyl group, an η⁵-2-methyl-4-naphthylindenyl group, an η⁵-fluorenyl group, an η⁵-2,7-dimethylfluorenyl group and an η⁵-2,7-di-tert-butylfluorenyl group; and derivatives thereof. The above term "η⁵-" may be omitted hereinafter.

Examples of the hetero atom in the above-mentioned hetero atom-containing group of L in the formula [4] are an oxygen atom, a sulfur atom, a nitrogen atom and a phosphorus atom. Examples of the hetero atom-containing group are an alkoxy group; an aryloxy group; a thioalkoxy group; a thioaryloxy group; an alkylamino group; an arylamino group; an alkylphosphino group; an arylphosphino group; an aromatic heterocyclic group, which contains, in its ring, one or more atoms selected from the group consisting of an oxygen atom, a sulfur atom, a nitrogen atom and a phosphorus atom; an aliphatic heterocyclic group, which contains, in its ring, one or more atoms selected from the group consisting thereof; and a chelating ligand.

Examples of the hetero atom-containing group are a methoxy group, an ethoxy group, a propoxy group, a butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxygroup, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitrosophenoxygroup, a 4-nitrophenoxygroup, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a dipropylamino group, a diphenylamino group, an isopropylamino group, a tert-butylamino group, a pyrrolyl group, a dimethylphosphino group, a 2-(2-oxy-1-propyl)phenoxy group, catechol, resorcinol, 4-isopropylcatechol, 3-methoxycatechol, a 1,8-dihydroxynaphthyl group, a 1,2-dihydroxynahpthyl group, a 2,2'-biphenyldiol group, a 1,1'-bi-2-naphthol group, a 2,2'-dihydroxy-6,6'-dimethylbiphenyl group, a 4,4',6,6'-tetra-tert-butyl-2,2'-methylenediphenoxy group, and a 4,4',6,6'-tetramethyl-2,2'-isobutylidenediphenoxy group.

A further example of the above-mentioned hetero atom-containing group is a group represented by the following formula [5]:

$$R^4_3P=N— \qquad [5]$$

wherein $R^4$ is independently of one another a hydrogen atom, a halogen atom or a hydrocarbon group; three $R^4$s are the same as, or different from one another; and two or more of three $R^4$s may be connected to one another, in which they may form a ring.

Examples of $R^4$ in the formula [5] are a hydrogen atom, a fluorine atom, a chlorine atom, a bromine atom, an iodine atom, a methyl group, an ethyl group, a n-propyl group, an isopropyl group, a n-butyl group, a tert-butyl group, a cyclopropyl group, a cyclobutyl group, a cycloheptyl group, a cyclohexyl group, a phenyl group, a 1-naphthyl group, a 2-naphthyl group and a benzyl group.

A still further example of the above-mentioned hetero atom-containing group is a group represented by the following formula [6]:

[6]

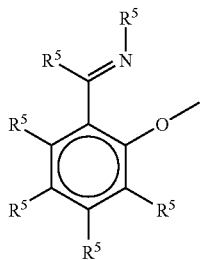

wherein $R^5$ is independently of one another a hydrogen atom, a halogen atom, a hydrocarbon group, a hydrocarbyloxy group, a silyl group or an amino group; all $R^5$s are the same as, or different from one another; and two or more of all $R^5$s may be connected to one another, in which they may form a ring.

Examples of $R^5$ in the formula [6] are a hydrogen atom, a fluorine atom, a chlorine atom, a bromine atom, an iodine atom, a phenyl group, a 1-naphthyl group, a 2-naphthyl group, a tert-butyl group, a 2,6-dimethylphenyl group, a 2-fluorenyl group, a 2-methylphenyl group, a 4-trifluoromethylphenyl group, a 4-methoxyphenyl group, a 4-pyridyl group, a cyclohexyl group, a 2-isopropylphenyl group, a benzyl group, a methyl group, a triethylsilyl group, a diphenylmethylsilyl group, a 1-methyl-1-phenylethyl group, a 1,1-dimethylpropyl group, and a 2-chlorophenyl group.

The "chelating ligand" of L in the above formula [4] means a ligand having two or more coordinating positions. Examples thereof are acetylacetonate, diimine, oxazoline, bisoxazoline, terpyridine, acylhydrazone, diethylenetriamine, triethylenetetramine, porphyrin, crown ether and cryptate.

When two or more Ls in the above formula [4] are connected to one another through a residual group, examples of the residual group are an alkylene group such as an ethylene group, a propylene group, a dimethylmethylene group and a diphenylmethylene group; a silylene group such as a silylene group, a dimethylsilylene group, a diphenylsilylene group and a tetramethyldisilylene group; and a hetero atom such as a nitrogen atom, an oxygen atom, a sulfur atom and a phosphorus atom.

Examples of the halogen atom of $X^2$ in the above formula [4] are a fluorine atom, a chlorine atom, a bromine atom and an iodine atom. Examples of the hydrocarbon group of $X^2$ therein are an alkyl group, an aralkyl group, an aryl group and an alkenyl group.

Examples of said alkyl group are a methyl group, an ethyl group, a n-propyl group, an isopropyl group, a n-butyl group, a sec-butyl group, a tert-butyl group, an isobutyl group, a n-pentyl group, a neopentyl group, a tert-pentyl group, a n-hexyl group, a n-octyl group, a n-decyl group, a n-dodecyl group, a n-pentadecyl group and a n-eicosyl group.

One or more hydrogen atoms contained in the above-mentioned alkyl groups may be substituted with a halogen atom such as a fluorine atom, a chlorine atom, a bromine atom and an iodine atom. Examples of the alkyl group substituted with a halogen atom are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group and a perbromopropyl group.

Also, one or more hydrogen atoms contained in the above-mentioned alkyl groups may be substituted with an alkoxy group such as a methoxy group and an ethoxy group; an aryloxy group such as a phenoxy group; or an aralkyloxy group such as a benzyloxy group.

The alkyl group as the hydrocarbon group of $X^2$ in the above formula [4] is preferably an alkyl group having 1 to 20 carbon atoms; and more preferably a methyl group, an ethyl group, an isopropyl group, a tert-butyl group, an isobutyl group or a tert-pentyl group.

Examples of the aralkyl group as the hydrocarbon group of $X^2$ in the above formula [4] are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-timethylphenyl)methyl group, a (2,3,5-timethylphenyl)methyl group, a (2,3,6-timethylphenyl)methyl group, a (3,4,5-timethylphenyl)methyl group, a (2,4,6-timethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a naphthylmethyl group and an anthracenylmethyl group.

One or more hydrogen atoms contained in the above-mentioned aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aralky group as the hydrocarbon group of $X^2$ in the above formula [4] is preferably an aralky group having 7 to 20 carbon atoms; and more preferably a benzyl group.

Examples of the aryl group as the hydrocarbon group of $X^2$ in the above formula [4] are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4 xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group.

One or more hydrogen atoms contained in the above-mentioned aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The aryl group as the hydrocarbon group of $X^2$ in the above formula [4] is preferably an aryl group having 6 to 20 carbon atoms; and more preferably a phenyl group.

Examples of the hydrocarbyloxy group as the hydrocarbon group of $X^2$ in the above formula [4] are an alkoxy group, aryloxy group and an aralkyloxy group. Among them, preferred is an alkoxy group having 1 to 20 carbon atoms, an aryloxy group having 6 to 20 carbon atoms, or an aralkyloxy group having 7 to 20 carbon atoms. Examples of the hydrocarbyloxy group are those exemplified as $X^1$ in the above formulas [2] and [3], a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, and a benzyloxy group. Among them, more preferred is a methoxy group, an ethoxy group, an isopropoxy group, a tert-butoxy group, an isobutoxy group, a phenoxy group, a 2,6-di(tert-butyl)phenoxy group or a benzyloxy group; further preferred is a methoxy group, a phenoxy group, a 2,6-di(tert-butyl) phenoxy group or a benzyloxy group; and particularly preferred is a methoxy group or a phenoxy group.

$X^2$ in the above formula [4] is more preferably a chlorine atom, a methyl group, an ethyl group, a n-propyl group, an isopropyl group, a n-butyl group, a benzyl group, an ally group, a methallyl group, a methoxy group, an ethoxy group or a phenoxy group; and further preferably a chlorine atom, a methyl group, a methoxy group or a phenoxy group.

Examples of the metal compound represented by the above formula [4] are bis(cyclopentadienyl)titanium dichloride, bis(methylcyclopentadienyl)titanium dichloride, bis(n-butylcyclopentadienyl)titanium dichloride, bis(dimethylcyclopentadienyl)titanium dichloride, bis(ethylmethylcyclopentadienyl)titanium dichloride, bis(trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titahium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl (fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, ethylenebis(cyclopentadienyl)titanium dichloride, ethylenebis(2-methylcyclopentadienyl)titanium dichloride, ethylenebis(3-methylcyclopentadienyl)titanium dichloride, ethylenebis(2-n-butylcyclopentadienyl)titanium dichloride, ethylenebis(3-n-butylcyclopentadienyl)titanium dichloride, ethylenebis(2,3-dimethylcyclopentadienyl)titanium dichloride, ethylenebis(2,4-dimethylcyclopentadienyl)titanium dichloride, ethylenebis(2,5-dimethylcyclopentadienyl)titanium dichloride, ethylenebis(3,4-dimethylcyclopentadienyl)titanium dichloride, ethylenebis(2,3-ethylmethylcyclopentadienyl)titanium dichloride, ethylenebis(2,4-ethylmethylcyclopentadienyl)titanium dichloride, ethylenebis(2,5-ethylmethylcyclopentadienyl)titanium dichloride, ethylenebis(3,5-ethylmethylcyclopentadienyl)titanium dichloride, ethylenebis(2,3,4-trimethylcyclopentadienyl)titanium dichloride, ethylenebis(2,3,5-trimethylcyclopentadienyl)titanium dichloride, ethylenebis(tetramethylcyclopentadienyl)titanium dichloride, ethylenebis(indenyl)titanium dichloride, ethylenebis(4,5,6,7-tetrahydroindenyl)titanium dichloride, ethylenebis(2-phenylindenyl)titanium dichloride, ethylenebis(fluorenyl)titanium dichloride, ethylene(cyclopentadienyl)(pentamethylcyclopentadienyl)titanium dichloride, ethylene(cyclopentadienyl)(indenyl)titanium dichloride, ethylene(methylcyclopentadienyl)(indenyl)titanium dichloride, ethylene(n-butylcyclopentadienyl)(indenyl)titanium dichloride, ethylene(tetramethylcyclopentadienyl) (indenyl)titanium dichloride, ethylene(cyclopentadienyl)(fluorenyl)titanium dichloride, ethylene(methylcyclopentadienyl)(fluorenyl)titanium dichloride, ethylene (pentamethylcyclopentadienyl)(fluorenyl)titanium dichloride, ethylene(n-butylcyclopentadienyl)(fluorenyl)titanium dichloride, ethylene (tetramethylpentadienyl)(fluorenyl)titanium dichloride, ethylene(indenyl)(fluorenyl)titanium dichloride, isopropylidenebis(cyclopentadienyl)titanium dichloride, isopropylidenebis(2-methylcyclopentadienyl)titanium dichloride, isopropylidenebis(3-methylcyclopentadienyl)titanium dichloride, isopropylidenebis(2-n-butylcyclopentadienyl)titanium dichloride, isopropylidenebis(3-n-butylcyclopentadienyl)titanium dichloride, isopropylidenebis(2,3-dimethylcyclopentadienyl)titanium dichloride, isopropylidenebis(2,4-dimethylcyclopentadienyl)titanium dichloride, isopropylidenebis(2,5-dimethylcyclopentadienyl)titanium dichloride, isopropylidenebis(3,4-dimethylcyclopentadienyl)titanium dichloride, isopropylidenebis(2,3-ethylmethylcyclopentadienyl)titanium dichloride, isopropylidenebis(2,4-ethylmethylcyclopentadienyl)titanium dichloride, isopropylidenebis(2,5-ethylmethylcyclopentadienyl)titanium dichloride, isopropylidenebis(3,5-ethylmethylcyclopentadienyl)titanium dichloride, isopropylidenebis(2,3,4-trimethylcyclopentadienyl)titanium dichloride, isopropylidenebis(2,3,5-trimethylcyclopentadienyl)titanium dichloride, isopropylidenebis(tetramethylcyclopentadienyl)titanium dichloride, isopropylidenebis(indenyl)titanium dichloride, isopropylidenebis(4,5,6,7-tetrahydroindenyl)titanium dichloride, isopropylidenebis(2-phenylindenyl)titanium dichloride, isopropylidenebis(fluorenyl)titanium dichloride, isopropylidene(cyclopentadienyl) (tetramethylcyclopentadienyl)titanium dichloride, isopropylidene(cyclopentadienyl)(indenyl)titanium dichloride, isopropylidene(methylcyclopentadienyl)(indenyl)titanium dichloride, isopropylidene(n-butylcyclopentadienyl)(indenyl)titanium dichloride, isopropylidene(tetramethylcyclopentadienyl) (indenyl)titanium dichloride, isopropylidene (cyclopentadienyl)(fluorenyl)titanium dichloride, isopropylidene(methylcyclopentadienyl)(fluorenyl)titanium dichloride, isopropylidene(n-butylcyclopentadienyl)(fluorenyl)titanium dichloride, isopropylidene(tetramethylcyclopentadienyl) (fluorenyl)titanium dichloride, isopropylidene (indenyl)(fluorenyl)titanium dichloride, dimethylsilylenebis(cyclopentadienyl)titanium dichloride, dimethylsilylenebis(2-methylcyclopentadienyl)titanium dichloride, dimethylsilylenebis(3-methylcyclopentadienyl)titanium dichloride, dimethylsilylenebis(2-n-butylcyclopentadienyl) titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis (2,3-ethylmethylcyclopentadienyl)titanium dichloride, dimethylsilylenebis(2,4-ethylmethylcyclopentadienyl)titanium dichloride, dimethylsilylenebis(2,5-ethylmethylcyclopentadienyl)titanium dichloride, dimethylsilylenebis(3,5-ethylmethylcyclopentadienyl)titanium dichloride, dimethylsilylenebis(2,3,4-trimethylcyclopentadienyl)titanium dichloride, dimethylsilylenebis(2,3,5-trimethylcyclopentadienyl)titanium dichloride, dimethylsilylenebis(tetramethylcyclopentadienyl)titanium dichloride, dimethylsilylenebis(indenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene(methylcyclopentadienyl) (indenyl)titanium dichloride, dimethylsilylene(n-butylcyclopentadienyl)(indenyl)titanium dichloride, dimethylsilylene (tetramethylcyclopentadienyl) (indenyl)titanium dichloride, dimethylsilylene(cyclopentadienyl)(fluorenyl)titanium dichloride, dimethylsilylene(methylcyclopentadienyl)(fluorenyl)titanium dichloride, dimethylsilylene(n-butylcyclopentadienyl)(fluorenyl)titanium dichloride, dimethylsilylene (tetramethylcyclopentadienyl)(indenyl)titanium dichloride, dimethylsilylene(indenyl)(fluorenyl)titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl) titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-di-tert-butylphenyl)titanium dichloride, indenyl(2,6-diisopropylphenyl)titanium dichloride, fluorenyl-(2,6-diisopropylphenyl)titanium dichloride, methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy)titanium dichloride, methylene(cyclopentadienyl)(3-phenyl-2-phenoxy)titanium dichloride, methylene(cyclopentadienyl)(3-tert-butyldimethylsilyl-5-methyl-2-phenoxy)titanium dichloride, methylene(cyclopentadienyl)(3-trimethylsilyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methylcyclopentadienyl)(3,5-dimethyl-2-phenoxy)titanium dichloride, methylene(methylcyclopentadienyl)(3-tert-butyl-2-phenoxy) titanium dichloride, methylene(methylcyclopentadienyl)(3-tert-butyl-5-methyl-2-phenoxy)titanium dichloride, methylene(methylcyclopentadienyl)(3-phenyl-2-phenoxy) titanium dichloride, methylene(methylcyclopentadienyl)(3-tert-butyldimethylsilyl-5methyl-2-phenoxy)titanium dichloride, methylene(methylcyclopentadienyl)(3-trimethylsilyl-5-methyl-2-phenoxy)titanium dichloride, methylene (methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tert-butylcyclopentadienyl) (3,5-dimethyl-2-phenoxy)titanium dichloride, methylene (tert-butylcyclopentadienyl)(3-tert-butyl-2-phenoxy) titanium dichloride, methylene(tert-butylcyclopentadienyl) (3-tert-butyl-5-methyl-2-phenoxy)titanium dichloride, methylene(tert-butylcyclopentadienyl)(3-phenyl-2-phenoxy)titanium dichloride, methylene(tert-butylcyclopentadienyl)(3-tert-butyldimethyl silyl-5-methyl-2-phenoxy)titanium dichloride, methylene(tert-butylcyclopentadienyl)(3-trimethylsilyl-5-methyl-2-phenoxy)titanium dichloride, methylene(tert-butylcyclopentadienyl)(3-tert-butyl-5-methoxy-2-phenoxy)titanium dichloride, methylene(tert-butylcyclopentadienyl)(3-tert-butyl-5-chloro-2-phenoxy)titanium dichloride, methylene(tetramethylcyclopentadienyl)(3,5-dimethyl-2-phenoxy)titanium dichloride, methylene(tetramethylcyclopentadienyl)(3-tert-butyl-2-phenoxy)titanium dichloride, methylene(tetramethylcyclopentadienyl)(3-tert-butyl-5-methyl-2-phenoxy)titanium dichloride, methylene (tetramethylcyclopentadienyl)(3-phenyl-2-phenoxy)titanium dichloride, methylene(tetramethylcyclopentadienyl) (3-tert-butyldimethyl silyl-5-methyl-2-phenoxy)titanium dichloride, methylene(tetramethylcyclopentadienyl)(3-trimethylsilyl-5-methyl-2-phenoxy)titanium dichloride, methylene(tetramethylcyclopentadienyl)(3-tert-butyl-5-methoxy-2-phenoxy)titanium dichloride, methylene (tetramethylcyclopentadienyl)(3-tert-butyl-5-chloro-2-phenoxy)titanium dichloride, methylene (trimethylsilylcyclopentadienyl)(3,5-dimethyl-2-phenoxy) titanium dichloride, methylene (trimethylsilylcyclopentadienyl)(3-tert-butyl-2-phenoxy) titanium dichloride, methylene (trimethylsilylcyclopentadienyl)(3-tert-butyl-5-methyl-2-phenoxy)titanium dichloride, methylene (trimethylsilylcyclopentadienyl)(3-phenyl-2-phenoxy) titanium dichloride, methylene (trimethylsilylcyclopentadienyl)(3-tert-butyl dimethylsilyl-5-methyl-2-phenoxy)titanium dichloride, methylene (trimethylsilylcyclopentadienyl)(3-trimethylsilyl-5-methyl-2-phenoxy)titanium dichloride, methylene (trimethylsilylcyclopentadienyl)(3-tert-butyl-5-methoxy-2-phenoxy)titanium dichloride, methylene (trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene (fluorenyl)(3-tert-butyl-2-phenoxy)titanium dichloride, methylene(fluorenyl)(3-tert-butyl-5-methyl-2-phenoxy)titanium dichloride, methylene(fluorenyl)(3-phenyl-2-phenoxy)titanium dichloride, methylene(fluorenyl)(3-tert-butyldimethylsilyl-5-methyl-2-phenoxy)titanium dichloride, methylene(fluorenyl)(3-trimethylsilyl-5-methyl-2-phenoxy) titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy) titanium dichloride, isopropylidene(cyclopentadienyl)(3-tert-butyl-2-phenoxy)titanium dichloride, isopropylidene (cyclopentadienyl)(3-tert-butyl-5-methyl-2-phenoxy) titanium dichloride, isopropylidene(cyclopentadienyl)(3-phenyl-2-phenoxy)titanium dichloride, isopropylidene (cyclopentadienyl)(3-tert-butyldimethylsilyl-5-methyl-2-phenoxy)titanium dichloride, isopropylidene (cyclopentadienyl)(3-trimethylsilyl-5-methyl-2-phenoxy) titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methylcyclopentadienyl)(3,5-dimethyl-2-phenoxy)titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethyl silyl-5-methyl-2-phenoxy)titanium dichloride, isopropylidene (methylcyclopentadienyl)(3-trimethylsilyl-5-methyl-2-phenoxy)titanium dichloride, isopropylidene (methylcyclopentadienyl)(3-tert-butyl-5-methoxy-2-phenoxy)titanium dichloride, isopropylidene (methylcyclopentadienyl)(3-tert-butyl-5-chloro-2-phenoxy)titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene (tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyl dimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene (tert-butylcyclopentadienyl)(3-tert-butyl-5-chloro-2-phenoxy)titanium dichloride, isopropylidene (tetramethylcyclopentadienyl)(3,5-dimethyl-2-phenoxy) titanium dichloride, isopropylidene (tetramethylcyclopentadienyl)(3-tert-butyl-2-phenoxy) titanium dichloride, isopropylidene (tetramethylcyclopentadienyl)(3-tert-butyl-5-methyl-2-phenoxy)titanium dichloride, isopropylidene (tetramethylcyclopentadienyl)(3-phenyl-2-phenoxy) titanium dichloride, isopropylidene (tetramethylcyclopentadienyl)(3-tert-butyl dimethylsilyl-5-methyl-2-phenoxy)titanium dichloride, isopropylidene (tetramethylcyclopentadienyl)(3-trimethylsilyl-5-methyl-2-phenoxy)titanium dichloride, isopropylidene (tetramethylcyclopentadienyl)(3-tert-butyl-5-methoxy-2-phenoxy)titanium dichloride, isopropylidene (tetramethylcyclopentadienyl)(3-tert-butyl-5-chloro-2-phenoxy)titanium dichloride, isopropylidene (trimethylsilylcyclopentadienyl)(3,5-dimethyl-2-phenoxy) titanium dichloride, isopropylidene (trimethylsilylcyclopentadienyl)(3-tert-butyl-2-phenoxy) titanium dichloride, isopropylidene (trimethylsilylcyclopentadienyl)(3-tert-butyl-5-methyl-2-phenoxy)titanium dichloride, isopropylidene (trimethylsilylcyclopentadienyl)(3-phenyl-2-phenoxy) titanium dichloride, isopropylidene (trimethylsilylcyclopentadienyl)(3-tert-butyl dimethylsilyl-5-methyl-2-phenoxy)titanium dichloride, isopropylidene (trimethylsilylcyclopentadienyl)(3-trimethylsilyl-5-methyl-2-phenoxy)titanium dichloride, isopropylidene (trimethylsilylcyclopentadienyl)(3-tert-butyl-5-methoxy-2-phenoxy)titanium dichloride, isopropylidene (trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene (fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy)titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene (cyclopentadienyl)(3,5-dimethyl-2-phenoxy)titanium dichloride, diphenylmethylene(cyclopentadienyl)(3-tert-butyl-2-phenoxy)titanium dichloride, diphenylmethylene(cyclopentadienyl)(3-tert-butyl-5-methyl-2-phenoxy)titanium dichloride, diphenylmethylene(cyclopentadienyl)(3-phenyl-2-phenoxy)titanium dichloride, diphenylmethylene(cyclopentadienyl)(3-tert-butyldimethylsilyl-5-methyl-2-phenoxy)titanium dichloride, diphenylmethylene (cyclopentadienyl)(3-trimethylsilyl-5-methyl-2-phenoxy) titanium dichloride, diphenylmethylene(cyclopentadienyl) (3-tert-butyl-5-methoxy-2-phenoxy)titanium dichloride, diphenylmethylene(cyclopentadienyl)(3-tert-butyl-5-chloro-2-phenoxy)titanium dichloride, diphenylmethylene (methylcyclopentadienyl)(3,5-dimethyl-2-phenoxy)titanium dichloride, diphenylmethylene (methylcyclopentadienyl)(3-tert-butyl-2-phenoxy)titanium dichloride, diphenylmethylene(methylcyclopentadienyl)(3-tert-butyl-5-methyl-2-phenoxy)titanium dichloride, diphenylmethylene(methylcyclopentadienyl)(3-phenyl-2-phenoxy)titanium dichloride, diphenylmethylene (methylcyclopentadienyl)(3-tert-butyldimethylsilyl-5-methyl-2-phenoxy)titanium dichloride, diphenylmethylene (methylcyclopentadienyl)(3-trimethylsilyl-5-methyl-2-phenoxy)titanium dichloride, diphenylmethylene (methylcyclopentadienyl)(3-tert-butyl-5-methoxy-2-phenoxy)titanium dichloride, diphenylmethylene (methylcyclopentadienyl)(3-tert-butyl-5-chloro-2-phenoxy) titanium dichloride, diphenylmethylene(tert-butylcyclopentadienyl)(3,5-dimethyl-2-phenoxy)titanium dichloride, diphenylmethylene(tert-butylcyclopentadienyl) (3-tert-butyl-2-phenoxy)titanium dichloride, diphenylmethylene(tert-butylcyclopentadienyl)(3-tert-butyl-5-methyl-2-phenoxy)titanium dichloride, diphenylmethylene(tert-butylcyclopentadienyl)(3-phenyl-2-phenoxy)titanium dichloride, diphenylmethylene(tert-butylcyclopentadienyl) (3-tert-butyldimethylsilyl-5-methyl-2-phenoxy)titanium dichloride, diphenylmethylene(tert-butylcyclopentadienyl) (3-trimethylsilyl-5-methyl-2-phenoxy)titanium dichloride, diphenylmethylene(tert-butylcyclopentadienyl)(3-tert-butyl-5-methoxy-2-phenoxy)titanium dichloride, diphenylmethylene(tert-butylcyclopentadienyl)(3-tert-butyl-5-chloro-2-phenoxy)titanium dichloride, diphenylmethylene (tetramethylcyclopentadienyl)(3,5-dimethyl-2-phenoxy) titanium dichloride, diphenylmethylene (tetramethylcyclopentadienyl)(3-tert-butyl-2-phenoxy) titanium dichloride, diphenylmethylene (tetramethylcyclopentadienyl)(3-tert-butyl-5-methyl-2-phenoxy)titanium dichloride, diphenylmethylene (tetramethylcyclopentadienyl)(3-phenyl-2-phenoxy) titanium dichloride, diphenylmethylene (tetramethylcyclopentadienyl)(3-tert-butyldimethylsilyl-5-methyl-2-phenoxy)titanium dichloride, diphenylmethylene (tetramethylcyclopentadienyl)(3-trimethylsilyl-5-methyl-2-phenoxy)titanium dichloride, diphenylmethylene (tetramethylcyclopentadienyl)(3-tert-butyl-5-methoxy-2-phenoxy)titanium dichloride, diphenylmethylene (tetramethylcyclopentadienyl)(3-tert-butyl-5-chloro-2-phenoxy)titanium dichloride, diphenylmethylene (trimethylsilylcyclopentadienyl)(3,5-dimethyl-2-phenoxy) titanium dichloride, diphenylmethylene (trimethylsilylcyclopentadienyl)(3-tert-butyl-2-phenoxy) titanium dichloride, diphenylmethylene (trimethylsilylcyclopentadienyl)(3-tert-butyl-5-methyl-2-phenoxy)titanium dichloride, diphenylmethylene (trimethylsilylcyclopentadienyl)(3-phenyl-2-phenoxy) titanium dichloride, diphenylmethylene (trimethylsilylcyclopentadienyl)(3-tert-butyldimethylsilyl- 5-methyl-2-phenoxy)titanium dichloride, diphenylmethylene(trimethylsilylcyclopentadienyl)(3-trimethylsilyl-5-methyl-2-phenoxy)titanium dichloride, diphenylmethylene(trimethylsilylcyclopentadienyl)(3-tert-butyl-5-methoxy-2-phenoxy)titanium dichloride, diphenylmethylene(trimethylsilylcyclopentadienyl)(3-tert-butyl-5-chloro-2-phenoxy)titanium dichloride, diphenylmethylene(fluorenyl)(3,5-dimethyl-2-phenoxy)titanium dichloride, diphenylmethylene(fluorenyl)(3-tert-butyl-2-phenoxy)titanium dichloride, diphenylmethylene(fluorenyl)(3-tert-butyl-5-methyl-2-phenoxy)titanium dichloride, diphenylmethylene(fluorenyl)(3-phenyl-2-phenoxy)titanium dichloride, diphenylmethylene(fluorenyl)(3-tert-butyldimethylsilyl-5-methyl-2-phenoxy)titanium dichloride, diphenylmethylene(fluorenyl)(3-trimethylsilyl-5-methyl-2-phenoxy)titanium dichloride, diphenylmethylene(fluorenyl)(3-tert-butyl-5-methoxy-2-phenoxy)titanium dichloride, diphenylmethylene(fluorenyl)(3-tert-butyl-5-chloro-2-phenoxy)titanium dichloride, dimethylsilylene(cyclopentadienyl)(2-phenoxy)titanium dichloride, dimethylsilylene(cyclopentadienyl)(3,5-dimethyl-2-phenoxy)titanium dichloride, dimethylsilylene(cyclopentadienyl)(3-tert-butyl-2-phenoxy)titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethylsilyl-5-methyl-2-phenoxy)titanium dichloride, dimethylsilylene(cyclopentadienyl)(5-methyl-3-trimethylsilyl-2-phenoxy)titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy)titanium dichloride, dimethylsilylene(methylcyclopentadienyl)(2-phenoxy)titanium dichloride, dimethylsilylene(methylcyclopentadienyl)(3-methyl-2-phenoxy)titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy)titanium dichloride, dimethylsilylene(methylcyclopentadienyl)(3,5-di-tert-butyl-2-phenoxy)titanium dichloride, dimethylsilylene(methylcyclopentadienyl)(5-methyl-3-phenyl-2-phenoxy)titanium dichloride, dimethylsilylene(methylcyclopentadienyl)(3-tert-butyldimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy)titanium dichloride, dimethylsilylene(methylcyclopentadienyl)(3,5-diamyl-2-phenoxy)titanium dichloride, dimethylsilylene(n-butylcyclopentadienyl)(2-phenoxy)titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyldimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy)titanium dichloride, dimethylsilylene(n-butylcyclopentadienyl)(3-tert-butyl-5-chloro-2-phenoxy)titanium dichloride, dimethylsilylene(n-butylcyclopentadienyl)(3,5-diamyl-2-phenoxy)titanium dichloride, dimethylsilylene(tert-butylcyclopentadienyl)(2-phenoxy)titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl)(3-tert-butyl-5-methyl-2-phenoxy)titanium dichloride, dimethylsilylene(tert-butylcyclopentadienyl)(3,5-di-tert-butyl-2-phenoxy)titanium dichloride, dimethylsilylene(tert-butylcyclopentadienyl)(5-methyl-3-phenyl-2-phenoxy)titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy)titanium dichloride, dimethylsilylene(tert-butylcyclopentadienyl)(3-tert-butyl-5-chloro-2-phenoxy)titanium dichloride, dimethylsilylene(tert-butylcyclopentadienyl)(3,5-diamyl-2-phenoxy)titanium dichloride, dimethylsilylene(tetramethylcyclopentadienyl)(2-phenoxy)titanium dichloride, dimethylsilylene(tetramethylcyclopentadienyl)(3-methyl-2-phenoxy)titanium dichloride, dimethylsilylene(tetramethylcyclopentadienyl)(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyldimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy)titanium dichloride, dimethylsilylene(trimethylsilylcyclopentadienyl)(2-phenoxy)titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl- 5-methyl-2-phenoxy)titanium dichloride, dimethylsilylene (trimethylsilylcyclopentadienyl)(5-methyl-3-trimethylsilyl-2-phenoxy)titanium dichloride, dimethylsilylene (trimethylsilylcyclopentadienyl)(3-tert-5-methoxy-2-phenoxy)titanium dichloride, dimethylsilylene (trimethylsilylcyclopentadienyl)(3-tert-butyl-5-chloro-2-phenoxy)titanium dichloride, dimethylsilylene (trimethylsilylcyclopentadienyl)(3,5-diamyl-2-phenoxy) titanium dichloride, dimethylsilylene(indenyl)(2-phenoxy) titanium dichloride, dimethylsilylene(indenyl)(3-methyl-2-phenoxy)titanium dichloride, dimethylsilylene(indenyl)(3,5-dimethyl-2-phenoxy)titanium dichloride, dimethylsilylene(indenyl)(3-tert-butyl-2-phenoxy)titanium dichloride, dimethylsilylene(indenyl)(3-tert-butyl-5-methyl-2-phenoxy)titanium dichloride, dimethylsilylene(indenyl)(3,5-di-tert-butyl-2-phenoxy)titanium dichloride, dimethylsilylene(indenyl)(5-methyl-3-phenyl-2-phenoxy)titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy)titanium dichloride, dimethylsilylene (indenyl)(3-tert-butyl-5-chloro-2-phenoxy)titanium dichloride, dimethylsilylene(indenyl)(3,5-diamyl-2-phenoxy)titanium dichloride, dimethylsilylene(fluorenyl)(2-phenoxy)titanium dichloride, dimethylsilylene(fluorenyl)(3-methyl-2-phenoxy)titanium dichloride, dimethylsilylene (fluorenyl)(3,5-dimethyl-2-phenoxy)titanium dichloride, dimethylsilylene(fluorenyl)(3-tert-butyl-2-phenoxy)titanium dichloride, dimethylsilylene(fluorenyl)(3-tert-butyl-5-methyl-2-phenoxy)titanium dichloride, dimethylsilylene (fluorenyl)(3,5-di-tert-butyl-2-phenoxy)titanium dichloride, dimethylsilylene(fluorenyl)(5-methyl-3-phenyl-2-phenoxy) titanium dichloride, dimethylsilylene(fluorenyl)(3-tert-butyldimethylsilyl-5-methyl-2-phenoxy)titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy) titanium dichloride, dimethylsilylene(fluorenyl)(3,5-diamyl-2-phenoxy)titanium dichloride, dimethylsilylene (tetramethylcyclopentadienyl)(1-naphthox-2-yl)titanium dichloride, (tert-butylamido)tetramethylcyclopentadienyl-1,2-ethanediyl titanium dichloride, (methylamido)tetramethylcyclopentadienyl-1,2-ethanediyl titanium dichloride, (ethylamido)tetramethylcyclopentadienyl-1,2-ethanediyl titanium dichloride, (tert-butylamido)tetramethylcyclopentadienyldimethylsilane titanium dichloride, (benzylamido) tetramethylcyclopentadienyldimethylsilane titanium dichloride, (phenylphosphido) tetramethylcyclopentadienyldimethylsilane titanium dichloride, (tert-butylamido)indenyl-1,2-ethanediyltitanium dichloride, (tert-butylamido)tetrahydroindenyl-1,2-ethanediyltitanium dichloride, (tert-butylamido)fluorenyl-1,2-ethanediyltitanium dichloride, (tert-butylamido)indenyldimethylsilanetitanium dichloride, (tert-butylamido) tetrahydroindenyldimethylsilane titanium dichloride, (tert-butylamido)fluorenyldimethylsilanetitanium dichloride, (dimethylaminomethyl)tetramethylcyclopentadienyl-titanium(III)dichloride, (dimethylaminoethyl)tetramethylcyclopentadienyl-titanium(III)dichloride, (dimethylaminopropyl) tetramethylcyclopentadienyl-titanium(III)dichloride, (N-pyrrolidinylethyl)tetramethylcyclopentadienyl-titanium dichloride, (B-dimethylaminoborabenzene)cyclopentadienyltitanium dichloride, cyclopentadienyl(9-mesitylboraanthracenyl)titanium dichloride, 2,2'-thiobis(4-methyl-6-tert-butylphenoxy)titanium dichloride, 2,2'-thiobis[4-methyl-6-(1-methylethyl)phenoxyltitanium dichloride, 2,2'-thiobis(4,6-dimethylphenoxy)titanium dichloride, 2,2'-thiobis(4-methyl-6-tert-butylphenoxy)titanium dichloride, 2,2'-methylenebis(4-methyl-6-tert-butylphenoxy)titanium dichloride, 2,2'-ethylenebis(4-methyl-6-tert-butylphenoxy) titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, (di-tert-butyl-1,3-propanediamido)titanium dichloride, (dicyclohexyl-1,3-propanediamido)titanium dichloride, [bis(trimethylsilyl)-1,3-propanediamido]titanium dichloride, (bis(tert-butyldimethylsilyl)-1,3-propanediamido]titanium dichloride, [bis(2,6-dimethylphenyl)-1,3-propanediamido] titanium dichloride, [bis(2,6-diisopropylphenyl)-1,3-propanediamido]titanium dichloride, [bis(2,6-di-tert-butylphenyl)-1,3-propanediamido]titanium dichloride, [bis (triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [hydrotris(3,5-dimethylpyrazolyl)borate]titanium trichloride, [hydrotris(3,5-diethylpyrazolyl)borate]titanium trichloride, [hydrotris(3,5-di-tert-butylpyrazolyl)borate]titanium trichloride, [tris(3,5-dimethylpyrazolyl) methyl]titanium trichloride, [tris(3,5-diethylpyrazolyl) methyl]titanium trichloride, and [tris(3,5-di-tert-butylpyrazolyl)methyl]titanium trichloride; and compounds obtained by replacing "titanium" in the above compounds with "zirconium" or "hafnium"; compounds obtained by replacing "(2-phenoxy)" in the above compounds with "(3-phenyl-2-phenoxy)", "(3-trimethylsilyl-2-phenoxy)" or "(3-tert-butyldimethylsilyl-2-phenoxy)"; compounds obtained by replacing "dimethylsilylene" in the above compounds with "diethylsilylene", "diphenylsilylene" or "dimethoxysilylene"; compounds obtained by replacing "dichloride" with "difluoride", "dibromide", "diiodide", "dimethyl", "diethyl", "diisopropyl", "bis(dimethylamido)", "bis(diethylamido)", "dimethoxide", "diethoxide", "di-n-butoxide", "diisopropoxide" or "bis(diacetoxy)"; and compounds obtained by replacing "trichloride" with "trifluoride", "tribromide", "triiodide", "trimethyl" "triethyl", "triisopropyl", "tris(dimethylamido)", "tris(diethylamido)", "trimethoxide", "triethoxide", "tri-n-butoxide", "triisopropoxide" or "tris(diacetoxy)".

Examples of the metal compound represented by the above formula [4], wherein the metal atom is a nickel atom, are 2,2'-methylenebis[(4R)-4-phenyl-5,5'-dimethyloxazoline] nickel dichloride, 2,2'-methylenebis[(4R)-4-phenyl-5,5'-dimethyloxazoline] nickel dibromide, 2,2'-methylenebis[(4R)-4-phenyl-5,5'-diethyloxazoline] nickel dichloride, 2,2'-methylenebis[(4R)-4-phenyl-5,5'-diethyloxazoline] nickel dibromide, 2,2'-methylenebis[(4R)-4-phenyl-5,5'-di-n-propyloxazoline]nickel dichloride, 2,2'-methylenebis[(4R)-4-phenyl-5,5'-di-n-propyloxazoline]nickel dibromide, 2,2'-methylenebis[(4R)-4-phenyl-5,5'-diisopropyloxazoline]nickel dichloride, 2,2'-methylenebis[(4R)-4-phenyl-5,5'-diisopropyloxazoline]nickel dibromide, 2,2'-methylenebis[(4R)-4-phenyl-5,5'-dicyclohexyloxazoline]nickel dichloride, 2,2'-methylenebis[(4R)-4-phenyl-5,5'-dicyclohexyloxazoline]nickel dibromide, 2,2'-methylenebis[(4R)-4-phenyl-5,5'-dimethoxyoxazoline] nickel dichloride,
2,2'-methylenebis[(4R)-4-phenyl-5,5'-dimethoxyoxazoline] nickel dibromide,
2,2'-methylenebis[(4R)-4-phenyl-5,5'-diethoxyoxazoline] nickel dichloride,
2,2'-methylenebis[(4R)-4-phenyl-5,5'-diethoxyoxazoline] nickel dibromide,
2,2'-methylenebis[(4R)-4-phenyl-5,5'-diphenyloxazoline] nickel dichloride,
2,2'-methylenebis[(4R)-4-phenyl-5,5'-diphenyloxazoline] nickel dibromide,
methylenebis[(4R)-4-methyl-5,5'-di-(2-methylphenyl)oxazoline]nickel dibromide,
methylenebis[(4R)-4-methyl-5,5'-di-(3-methylphenyl)oxazoline]nickel dibromide,
methylenebis[(4R)-4-methyl-5,5'-di-(4-methylphenyl)oxazoline]nickel dibromide,
methylenebis[(4R)-4-methyl-5,5'-di-(2-methoxyphenyl)oxazoline]nickel dibromide,
methylenebis[(4R)-4-methyl-5,5'-di-(3-methoxyphenyl)oxazoline]nickel dibromide,
methylenebis[(4R)-4-methyl-5,5'-di-(4-methoxyphenyl)oxazoline]nickel dibromide,
methylenebis[spiro{(4R)-4-methyloxazoline-5,1'-cyclobutane}] nickel dibromide,
methylenebis[spiro{(4R)-4-methyloxazoline-5,1'-cyclopentane}]nickel dibromide,
methylenebis[spiro{(4R)-4-methyloxazoline-5,1'-cyclohexane}]nickel dibromide,
methylenebis[spiro{(4R)-4-methyloxazoline-5,1'-cycloheptane}]nickel dibromide,
2,2'-methylenebis[(4R)-4-isopropyl-5,5-dimethyloxazoline] nickel dibromide,
2,2'-methylenebis[(4R)-4-isopropyl-5,5-diethyloxazoline] nickel dibromide,
2,2'-methylenebis[(4R)-4-isopropyl-5,5-di-n-propyloxazoline]nickel dibromide,
methylenebis[(4R)-4-isopropyl-5,5-diisopropyloxazoline] nickel dibromide, 2,2'-methylenebis[(4R)-4-isopropyl-5,5-dicyclohexyloxazoline]nickel dibromide,
2,2'-methylenebis[(4R)-4-isopropyl-5,5-diphenyloxazoline] nickel dibromide,
2,2'-methylenebis[(4R)-4-isopropyl-5,5-di-(2-methylphenyl)oxazoline]nickel dibromide,
2,2'-methylenebis[(4R)-4-isopropyl-5,5-di-(3-methylphenyl)oxazoline]nickel dibromide,
2,2'-methylenebis[(4R)-4-isopropyl-5,5-di-(4-methylphenyl)oxazoline]nickel dibromide,
2,2'-methylenebis[(4R)-4-isopropyl-5,5-di-(2-methoxyphenyl)oxazoline]nickel dibromide,
2,2'-methylenebis[(4R)-4-isopropyl-5,5-di-(3-methoxyphenyl)oxazoline]nickel dibromide,
2,2'-methylenebis[(4R)-4-isopropyl-5,5-di-(4-methoxyphenyl)oxazoline]nickel dibromide,
2,2'-methylenebis[spiro{(4R)-4-isopropyloxazoline-5,1'-cyclobutane}]nickel dibromide,
2,2'-methylenebis[spiro{(4R)-4-isopropyloxazoline-5,1'-cyclopentane}]nickel dibromide,
2,2'-methylenebis[spiro{(4R)-4-isopropyloxazoline-5,1'-cyclohexane}]nickel dibromide,
2,2'-methylenebis[spiro{(4R)-4-isopropyloxazoline-5,1'-cycloheptane}]nickel dibromide,
2,2-methylenebis[(4R)-4-isobutyl-5,5-dimethyloxazoline] nickel dibromide,
2,2'-methylenebis[(4R)-4-isobutyl-5,5-diethyloxazoline] nickel dibromide,
2,2'-methylenebis[(4R)-4-isobutyl-5,5-di-n-propyloxazoline]nickel dibromide,
2,2'-methylenebis[(4R)-4-isobutyl-5,5-diisopropyloxazoline]nickel dibromide, 2,2'-methylenebis[(4R)-4-isobutyl-5,5-dicyclohexyloxazoline]nickel dibromide,
2,2'-methylenebis[(4R)-4-isobutyl-5,5-diphenyloxazoline] nickel dibromide,
2,2'-methylenebis[(4R)-4-isobutyl-5,5-di-(2-methylphenyl)oxazoline]nickel dibromide,
2,2'-methylenebis[(4R)-4-isobutyl-5,5-di-(3-methylphenyl)oxazoline]nickel dibromide,
2,2'-methylenebis[(4R)-4-isobutyl-5,5-di-(4-methylphenyl)oxazoline]nickel dibromide,
2,2'-methylenebis[(4R)-4-isobutyl-5,5-di-(2-methoxyphenyl)oxazoline]nickel dibromide,
2,2'-methylenebis[(4R)-4-isobutyl-5,5-di-(3-methoxyphenyl)oxazoline]nickel dibromide,
2,2'-methylenebis[(4R)-4-isobutyl-5,5-di-(4-methoxyphenyl)oxazoline]nickel dibromide,
2,2'-methylenebis[spiro{(4R)-4-isobutyloxazoline-5,1'-cyclobutane}]nickel dibromide,
2,2'-methylenebis[spiro{(4R)-4-isobutyloxazoline-5,1'-cyclopentane}]nickel dibromide,
2,2'-methylenebis[spiro{(4R)-4-isobutyloxazoline-5,1'-cyclohexane}]nickel dibromide,
2,2'-methylenebis[spiro{(4R)-4-isobutyloxazoline-5,1'-cycloheptane}]nickel dibromide,
2,2'-methylenebis[(4R)-4-tert-butyl-5,5-dimethyloxazoline] nickel dibromide,
2,2'-methylenebis[(4R)-4-tert-butyl-5,5-diethyloxazoline] nickel dibromide,
2,2'-methylenebis[(4R)-4-tert-butyl-5,5-di-n-propyloxazoline]nickel dibromide,
2,2'-methylenebis[(4R)-4-tert-butyl-5,5-diisopropyloxazoline]nickel dibromide,
2,2'-methylenebis[(4R)-4-tert-butyl-5,5-diphenyloxazoline] nickel dibromide, 2,2'-methylenebis[(4R)-4-tert-butyl-5,5-dicyclohexyloxazoline]nickel dibromide,
2,2'-methylenebis[(4R)-4-tert-butyl-5,5-di-(2-methylphenyl)oxazoline]nickel dibromide,
2,2'-methylenebis[(4R)-4-tert-butyl-5,5-di-(3-methylphenyl)oxazoline]nickel dibromide,
2,2'-methylenebis[(4R)-4-tert-butyl-5,5-di-(4-methylphenyl)oxazoline]nickel dibromide,
2,2'-methylenebis[(4R)-4-tert-butyl-5,5-di-(2-methoxyphenyl)oxazoline]nickel dibromide,
2,2'-methylenebis[(4R)-4-tert-butyl-5,5-di-(3-methoxyphenyl)oxazoline]nickel dibromide,
2,2'-methylenebis[(4R)-4-tert-butyl-5,5-di-(4-methoxyphenyl)oxazoline]nickel dibromide,
2,2'-methylenebis[spiro{(4R)-4-tert-butyloxazoline-5,1'-cyclobutane}]nickel dibromide,
2,2'-methylenebis[spiro{(4R)-4-tert-butyloxazoline-5,1'-cyclopentane}]nickel dibromide,
2,2'-methylenebis[spiro{(4R)-4-tert-butyloxazoline-5,1'-cyclohexane}]nickel dibromide,
2,2'-methylenebis[spiro{(4R)-4-tert-butyloxazoline-5,1'-cycloheptane}]nickel dibromide,
2,2'-methylenebis[(4R)-4-phenyl-5,5-dimethyloxazoline] nickel dibromide,
2,2'-methylenebis[(4R)-4-phenyl-5,5-diethyloxazoline] nickel dibromide,
2,2'-methylenebis[(4R)-4-phenyl-5,5-di-n-propyloxazoline] nickel dibromide, 2,2'-methylenebis[(4R)-4-phenyl-5,5-diisopropyloxazoline]
nickel dibromide,
2,2'-methylenebis[(4R)-4-phenyl-5,5-dicyclohexyloxazoline]nickel dibromide,
2,2'-methylenebis[(4R)-4-phenyl-5,5-diphenyl)oxazoline]
nickel dibromide,
2,2'-methylenebis[(4R)-4-phenyl-5,5-di-(2-methylphenyl)
oxazoline]nickel dibromide,
2,2'-methylenebis[(4R)-4-phenyl-5,5-di-(3-methylpheny)
oxazoline]nickel dibromide,
2,2'-methylenebis[(4R)-4-phenyl-5,5-di-(4-methylphenyl)
oxazoline]nickel dibromide,
2,2'-methylenebis[(4R)-4-phenyl-5,5-di-(2-methoxyphenyl)
oxazoline]nickel dibromide,
2,2'-methylenebis[(4R)-4-phenyl-5,5-di-(3-methoxyphenyl)
oxazoline]nickel dibromide,
2,2'-methylenebis[(4R)-4-phenyl-5,5-di-(4-methoxyphenyl)
oxazoline]nickel dibromide,
methylenebis[spiro{(4R)-4-phenyloxazoline-5,1'-cyclobutane}]nickel dibromide,
2,2'-methylenebis[spiro{(4R)-4-phenyloxazoline-5,1'-cyclopentane}]nickel dibromide,
2,2'-methylenebis[spiro{(4R)-4-phenyloxazoline-5,1'-cyclohexane}]nickel dibromide,
2,2'-methylenebis[spiro{(4R)-4-phenyloxazoline-5,1'-cycloheptane}]nickel dibromide,
2,2'-methylenebis[(4R)-4-benzyl-5,5-dimethyloxazoline]
nickel dibromide,
2,2'-methylenebis[(4R)-4-benzyl-5,5-diethyloxazoline]
nickel dibromide,
2,2'-methylenebis[(4R)-4-benzyl-5,5-di-n-propyloxazoline]
nickel dibromide,
2,2'-methylenebis[(4R)-4-benzyl-5,5-diisopropyloxazoline]
nickel dibromide,
2,2'-methylenebis[(4R)-4-benzyl-5,5-dicyclohexyloxazoline]nickel dibromide,
2,2'-methylenebis[(4R)-4-benzyl-5,5-diphenyl)oxazoline]
nickel dibromide,
2,2'-methylenebis[(4R)-4-benzyl-5,5-di-(2-methylphenyl)
oxazoline]nickel dibromide,
2,2'-methylenebis[(4R)-4-benzyl-5,5-di-(3-methylphenyl)
oxazoline]nickel dibromide,
2,2'-methylenebis[(4R)-4-benzyl-5,5-di-(4-methylphenyl)
oxazoline]nickel dibromide,
2,2'-methylenebis[(4R)-4-benzyl-5,5-di-(2-methoxyphenyl)
oxazoline]nickel dibromide,
2,2'-methylenebis[(4R)-4-benzyl-5,5-di-(3-methoxyphenyl)
oxazoline]nickel dibromide,
2,2'-methylenebis[(4R)-4-benzyl-5,5-di-(4-methoxyphenyl)
oxazoline]nickel dibromide,
2,2'-methylenebis[spiro{(4R)-4-benzyloxazoline-5,1'-cyclobutane}]nickel dibromide,
2,2'-methylenebis[spiro{(4R)-4-benzyloxazoline-5,1'-cyclopentane}]nickel dibromide,
2,2'-methylenebis[spiro{(4R)-4-benzyloxazoline-5,1'-cyclohexane}]nickel dibromide, and
2,2'-methylenebis[spiro{(4R)-4-benzyloxazoline-5,1'-cycloheptane}]nickel dibromide; and enantiomers of the above-mentioned compounds. Further examples are compounds having an inverted configuration regarding an asymmetric carbon atom contained in one oxazoline ring of each of the above-mentioned bisoxazoline-type compounds; and compounds obtained by replacing "dibromide" contained in the above-mentioned compounds with "dichloride", "dimethyl", "dimethoxide" or "bis(diacetoxy)".

Also, examples of the nickel compound are
[hydrotris(3,5-dimethylpyrazolyl)borate]nickel chloride,
[hydrotris(3,5-dimethylpyrazolyl)borate]nickel bromide,
[hydrotris(3,5-dimethylpyrazolyl)borate]nickel iodide,
[hydrotris(3,5-dimethylpyrazolyl)borate]nickel methyl,
[hydrotris(3,5-dimethylpyrazolyl)borate]nickel ethyl,
[hydrotris(3,5-dimethylpyrazolyl)borate]nickel allyl, [hydrotris(3,5-dimethylpyrazolyl)borate]nickel methallyl,
[hydrotris(3,5-diethylpyrazolyl)borate]nickel chloride,
[hydrotris(3,5-diethylpyrazolyl)borate]nickel bromide,
[hydrotris(3,5-diethylpyrazolyl)borate]nickel iodide, [hydrotris(3,5-diethylpyrazolyl)borate]nickel methyl, [hydrotris(3,5-diethylpyrazolyl)borate]nickel ethyl, [hydrotris(3,5-diethylpyrazolyl)borate]nickel allyl, [hydrotris(3,5-diethylpyrazolyl)borate]nickel methallyl, [hydrotris(3,5-di-tert-butylpyrazolyl)borate]nickel chloride, [hydrotris(3,5-di-tert-butylpyrazolyl)borate]nickel bromide, [hydrotris(3,5-di-tert-butylpyrazolyl)borate]nickel iodide, [hydrotris(3,5-di-tert-butylpyrazolyl)borate] nickel methyl, [hydrotris(3,5-di-tert-butylpyrazolyl)borate]nickel ethyl, [hydrotris(3,5-di-tert-butylpyrazolyl) borate]nickel allyl, and [hydrotris(3,5-di-tert-butylpyrazolyl)borate]nickel methallyl.

Further examples of the nickel compound are those represented by the following formula [7]:

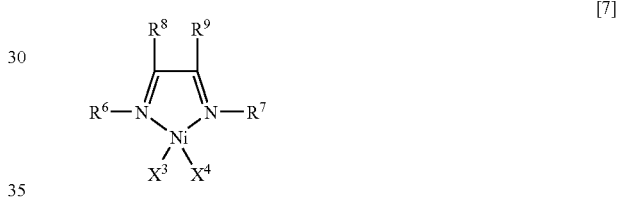

[7]

wherein each of $R^6$ and $R^7$ is a 2,6-diisopropylphenyl group; and $X^3$, $X^4$, $R^8$ and $R^9$ are any of the following combinations 1 to 30 shown in the following Table 1, wherein F, Cl, I, Me, Et, n-Pr, i-Pr, n-Bu, Ph, Bz and H are a fluorine atom, a chlorine atom, an iodine atom, a methyl group, an ethyl group, a n-propyl group, an isopropyl group, a n-butyl group, a phenyl group, a benzyl group, and a hydrogen atom, respectively; and the acenaphthene group is formed by linking of $R^8$ with $R^9$.

Still further examples of the nickel compound are those obtained by replacing "nickel" contained in the above-mentioned nickel compounds with "palladium", "cobalt", "rhodium" or "ruthenium".

Examples of the metal compound represented by the above formula [4] are
2,6-bis-[1-(2,6-dimethylphenylimino)ethyl]pyridineiron
dichloride,
2,6-bis-[1-(2,6-diisopropylphenylimino)ethyl]pyridineiron
dichloride,
2,6-bis-[1-(2-tert-butylphenylimino)ethyl]pyridineiron
dichloride, [hydrotris(3,5-dimethylpyrazolyl)borate]iron chloride, [hydrotris(3,5-dimethylpyrazolyl)borate]iron bromide, [hydrotris(3,5-dimethylpyrazolyl)borate]iron iodide, [hydrotris(3,5-dimethylpyrazolyl)borate]iron methyl, [hydrotris(3,5-dimethylpyrazolyl)borate]iron ethyl, [hydrotris(3,5-dimethylpyrazolyl)borate]iron allyl, [hydrotris(3,5-dimethylpyrazolyl)borate]iron methallyl, [hydrotris(3,5-diethylpyrazolyl)borate]iron chloride, [hydrotris(3,5-diethylpyrazolyl)borate]iron bromide, [hydrotris(3,5-diethylpyrazolyl)borate]iron iodide, [hydrotris(3, 5-diethylpyrazolyl)borate]iron methyl, [hydrotris(3,5-diethylpyrazolyl)borate]iron ethyl, [hydrotris(3,5-diethylpyrazolyl)borate]iron allyl, [hydrotris(3,5-diethylpyrazolyl)borate]iron methallyl, [hydrotris(3,5-di-tert-butylpyrazolyl)borate]iron chloride, [hydrotris(3,5-di-tert-butylpyrazolyl)borate]iron bromide, [hydrotris(3,5-di-tert-butylpyrazolyl)borate]iron iodide, [hydrotris(3,5-di-tert-butylpyrazolyl)borate]iron methyl, [hydrotris(3,5-di-tert-butylpyrazolyl)borate]iron ethyl, [hydrotris(3,5-di-tert-butylpyrazolyl)borate]iron allyl, and [hydrotris(3,5-di-tert-butylpyrazolyl)borate]iron methallyl; and compounds obtained by replacing "iron" contained in the above-mentioned iron compounds with "cobalt" or "nickel".

TABLE 1

| Combination | $X^3$ | $X^4$ | $R^8$ | $R^9$ |
|---|---|---|---|---|
| 1 | F | F | H | H |
| 2 | Cl | Cl | H | H |
| 3 | I | I | H | H |
| 4 | Me | Me | H | H |
| 5 | Et | Et | H | H |
| 6 | n-Pr | n-Pr | H | H |
| 7 | i-Pr | i-Pr | H | H |
| 8 | n-Bu | n-Bu | H | H |
| 9 | Ph | Ph | H | H |
| 10 | Bz | Bz | H | H |
| 11 | F | F | Me | Me |
| 12 | Cl | Cl | Me | Me |
| 13 | I | I | Me | Me |
| 14 | Me | Me | Me | Me |
| 15 | Et | Et | Me | Me |
| 16 | n-Pr | n-Pr | Me | Me |
| 17 | i-Pr | i-Pr | Me | Me |
| 18 | n-Bu | n-Bu | Me | Me |
| 19 | Ph | Ph | Me | Me |
| 20 | Bz | Bz | Me | Me |
| 21 | F | F | acenaphthene group | |
| 22 | Cl | Cl | acenaphthene group | |
| 23 | I | I | acenaphthene group | |
| 24 | Me | Me | acenaphthene group | |
| 25 | Et | Et | acenaphthene group | |
| 26 | n-Pr | n-Pr | acenaphthene group | |
| 27 | i-Pr | i-Pr | acenaphthene group | |
| 28 | n-Bu | n-Bu | acenaphthene group | |
| 29 | Ph | Ph | acenaphthene group | |
| 30 | Bz | Bz | acenaphthene group | |

Examples of the μ-oxo type compound represented by the above formula [4] are
μ-oxobis[isopropylidene(cyclopentadienyl)(2-phenoxy)titanium chloride],
μ-oxobis[isopropylidene(cyclopentadienyl)(2-phenoxy)titanium methoxide],
μ-oxobis[isopropylidene(cyclopentadienyl)(3-tert-butyl-5-methyl-2-phenoxy)titanium chloride],
μ-oxobis[isopropylidene(cyclopentadienyl)(3-tert-butyl-5-methyl-2-phenoxy)titanium methoxide],
μ-oxobis[isopropylidene(methylcyclopentadienyl)(2-phenoxy)titanium chloride],
μ-oxobis[isopropylidene(methylcyclopentadienyl)(2-phenoxy)titanium methoxide],
μ-oxobis[isopropylidene(methylcyclopentadienyl)(3-tert-butyl-5-methyl-2-phenoxy)titanium chloride],
μ-oxobis[isopropylidene(methylcyclopentadienyl)(3-tert-butyl-5-methyl-2-phenoxy)titanium methoxide],
μ-oxobis[isopropylidene(tetramethylcyclopentadienyl)(2-phenoxy)titanium chloride],
μ-oxobis[isopropylidene(tetramethylcyclopentadienyl)(2-phenoxy)titanium methoxide],
μ-oxobis[isopropylidene(tetramethylcyclopentadienyl)(3-tert-butyl-5-methyl-2-phenoxy)titanium chloride],
μ-oxobis[isopropylidene (tetramethylcyclopentadienyl)(3-tert-butyl-5-methyl-2-phenoxy)titanium methoxide],
μ-oxobis[dimethylsilylene(cyclopentadienyl)(2-phenoxy)titanium chloride],
μ-oxobis[dimethylsilylene(cyclopentadienyl)(2-phenoxy)titanium methoxide],
μ-oxobis[dimethylsilylene(cyclopentadienyl)(3-tert-butyl-5-methyl-2-phenoxy)titanium chloride],
μ-oxobis[dimethylsilylene(cyclopentadienyl)(3-tert-butyl-5-methyl-2-phenoxy)titanium methoxide],
μ-oxobis[dimethylsilylene(methylcyclopentadienyl) (2-phenoxy)titanium chloride],
μ-oxobis[dimethylsilylene(methylcyclopentadienyl) (2-phenoxy)titanium methoxide],
μ-oxobis[dimethylsilylene(methylcyclopentadienyl)(3-tert-butyl-5-methyl-2-phenoxy)titanium chloride],
μ-oxobis[dimethylsilylene(methylcyclopentadienyl)(3-tert-butyl-5-methyl-2-phenoxy)titanium methoxide],
μ-oxobis[dimethylsilylene(tetramethylcyclopentadienyl)(2-phenoxy)titanium chloride],
μ-oxobis[dimethylsilylene(tetramethylcyclopentadienyl)(2-phenoxy)titanium methoxide],
μ-oxobis[dimethylsilylene(tetramethylcyclopentadienyl)(3-tert-butyl-5-methyl-2-phenoxy)titanium chloride],
μ-oxobis[dimethylsilylene (tetramethylcyclopentadienyl)(3-tert-butyl-5-methyl-2-phenoxy)titanium methoxide],
di-μ-oxobis[isopropylidene(cyclopentadienyl)(2-phenoxy)titanium],
di-μ-oxobis[isopropylidene(cyclopentadienyl)(3-tert-butyl-5-methy-2-phenoxy)titanium],
di-μ-oxobis[isopropylidene (methylcyclopentadienyl)(2-phenoxy)titanium],
di-μ-oxobis[isopropylidene(methylcyclopentadienyl)(3-tert-butyl-5-methyl-2-phenoxy)titanium],
di-μ-oxobis[isopropylidene(tetramethylcyclopentadienyl) (2-phenoxy)titanium],
di-μ-oxobis[isopropylidene(tetramethylcyclopentadienyl) (3-tert-butyl-5-methyl-2-phenoxy)titanium],
di-μ-oxobis[dimethylsilylene(cyclopentadienyl)(2-phenoxy)titanium],
di-μ-oxobis[dimethylsilylene(cyclopentadienyl)(3-tert-butyl-5-methyl-2-phenoxy)titanium],
di-μ-oxobis[dimethylsilylene(methylcyclopentadienyl)(2-phenoxy)titanium],
di-μ-oxobis[dimethylsilylene(methylcyclopentadienyl)(3-tert-butyl-5-methyl-2-phenoxy)titanium],
di-μ-oxobis[dimethylsilylene(tetramethylcyclopentadienyl) (2-phenoxy)titanium], and
di-μ-oxobis[dimethylsilylene(tetramethylcyclopentadienyl) (3-tert-butyl-5-methyl-2-phenoxy)titanium].

In addition to the above-exemplified compounds of the metal compound represented by the above formula [4], and the above-exemplified μ-oxo type metal compounds thereof, examples of the component (B), wherein the metal atom is a nickel atom, are nickel chloride, nickel bromide, nickel iodide, nickel sulfate, nickel nitrate, nickel perchlorate, nickel acetate, nickel trifluoroacetate, nickel cyanide, nickel oxalate, nickel acetylacetonate, bis(allyl)nickel, bis(1,5-cyclooctadiene)nickel, dichloro(1,5-cyclooctadiene)nickel, dichlorobis(acetonitrile)nickel, dichlorobis(benzonitrile) nickel, carbonyltris(triphenylphosphine)nickel, dichlorobis (triethylphosphine)nickel, diacetobis(triphenylphosphine) nickel, tetrakis(triphenylphosphine)nickel, dichloro[1,2-bis (diphenylphosphino)ethane]nickel, bis[1,2-bis (diphenylphosphino)ethane]nickel, dichloro[1,3-bis (diphenylphosphino)propane]nickel, bis[1,3-bis(diphenylphosphino)propane]nickel, tetraaminenickel nitrate, tetrakis(acetonitrile)nickel tetrafluoroborate, and nickel phthalocyanine.

Similarly, examples of the component (B), wherein the metal atom is a vanadium atom, are vanadium acetylacetonate, vanadium tetrachloride and vanadium oxy trichloride; an example of the component (B), wherein the metal atom is a samarium atom, is bis(pentamethylcyclopentadienyl) samarium methyltetrahydrofuran; and an example of the component (B), wherein the metal atom is an ytterbium atom, is bis(pentamethylcyclopentadienyl)ytterbium methyltetrahydrofuran.

The above-mentioned component (B) is used solely, or in combination of two or more thereof. Among the above-mentioned component (B), preferred is the compound represented by the above formula [4]. And, further among them, preferred is a metal compound, whose $M^2$ is a transition metal atom; and particularly preferred is a metal compound, whose one or more Ls are cyclopentadiene-containing anionic groups, namely, a metallocene metal compound.

The component (C) may be an organoaluminum compound known in the art. The component (C) is preferably an organoaluminum compound represented by the following formula [8]:

$$R^{10}{}_d AlQ_{3-d} \quad [8]$$

wherein d is an integer satisfying $0<d\leq 3$; $R^{10}$ is a hydrocarbon group, and when two or more. $R^{10}$ groups exist, they are the same as, or different from one another; and Q is a hydrogen atom, a halogen atom or a hydrocarbyloxy group, and when two or more Qs exist, they are the same as, or different from one another.

$R^{10}$ in the formula [8] is preferably a hydrocarbon group having 1 to 24 carbon atoms, and more preferably an alkyl group having 1 to 24 carbon atoms. Examples thereof are a methyl group, an ethyl group, a n-propyl group, a n-butyl group, an isobutyl group, a n-hexyl group, a 2-methylhexyl group and a n-octyl group. Among them, preferred is an ethyl group, a n-butyl group, an isobutyl group, or a n-hexyl group.

Examples of the halogen atom of Q in the formula [8] are a fluorine atom, a chlorine atom, a bromine atom and an iodine atom. Among them, preferred is a chlorine atom.

The hydrocarbyloxy group of Q in the formula [8] is preferably an alkoxy group, an aralkyloxy group or an aryloxy group.

Examples of said alkoxy group are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicosoxy group.

One or more hydrogen atoms contained in the above-mentioned alkoxy groups may be substituted with a halogen atom such as a fluorine atom, a chlorine atom, a bromine atom and an iodine atom; an alkoxy group such as a methoxy group and an ethoxy group; or an aryloxy group such as a phenoxy group.

The alkoxy group as the hydrocarbyloxy group of Q in the formula [8] is preferably an alkoxy group having 1 to 24 carbon atoms, and more preferably a methoxy group, an ethoxy group or a tert-butoxy group.

Examples of the aryloxy group as the hydrocarbyloxy group of Q in the formula [8] are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthrathenoxy group.

One or more hydrogen atoms contained in the above-mentioned aryloxy groups may be substituted with a halogen atom such as a fluorine atom, a chlorine atom, a bromine atom and an iodine atom; an alkoxy group such as a methoxy group and an ethoxy group; or an aryloxy group such as a phenoxy group.

The aryloxy group as the hydrocarbyloxy group of Q in the formula [8] is preferably an aryloxy group having 6 to 24 carbon atoms.

Examples of the aralkyloxy group as the hydrocarbyloxy group of Q in the formula [8] are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl) methoxy group, a (n-decylphenyl)methoxy group, a (n-tetradecylphenyl)methoxy group, a naphthylmethoxy group and an anthrathenylmethoxy group.

One or more hydrogen atoms contained in the above-mentioned aralkyloxy groups may be substituted with a halogen atom such as a fluorine atom, a chlorine atom, a bromine atom and an iodine atom; an alkoxy group such as a methoxy group and an ethoxy group; or an aryloxy group such as a phenoxy group.

The aralkyloxy group as the hydrocarbyloxy group of Q in the formula [8] is preferably an aralkyloxy group having 7 to 24 carbon atoms, and more preferably a benzyloxy group.

Examples of the organoaluminum compound represented by the above formula [8] are a trialkylaluminum such as trimethylaluminum, triethylaluminum, tri-n-propylaluminum, tri-n-butylaluminum, triisobutylaluminum, tri-n-hexylaluminum and tri-n-octylaluminum; a dialkylaluminum chloride such as dimethylaluminum chloride, diethylaluminum chloride, di-n-propylaluminum chloride, di-n-butylaluminum chloride, diisobutylaluminum chloride and di-n-hexylaluminum chloride; an alkylaluminum dichloride such as methylaluminum dichloride, ethylaluminum dichloride, n-propylaluminum dichloride, n-butylaluminum dichloride, isobutylaluminum dichloride and n-hexylaluminum dichloride; a dialkylaluminum hydride such as dimethylaluminum hydride, diethylaluminum hydride, di-n-propylaluminum hydride, di-n-butylaluminum hydride, diisobutylaluminum hydride and di-n-hexylaluminum hydride; an alkyl(dialkoxy)aluminum such as methyl(dimethoxy)aluminum, methyl(diethoxy)aluminum and methyl(di-tert-butoxy)aluminum; a dialkyl(alkoxy)aluminum such as dimethyl(methoxy)aluminum, dimethyl(ethoxy)aluminum and dimethyl(tert-butoxy)aluminum; a triaryloxy aluminum such as triphenoxyaluminum, tris(2,6-diisopropylphenoxy)aluminum and tris(2,6-diphenylphenoxy)aluminum; an alkyl(diaryloxy)aluminum such as methyl(diphenoxy)aluminum, methylbis(2,6-diisopropylphenoxy)aluminum and methylbis(2,6-diphenylphenoxy)aluminum; and a dialkyl(aryloxy) aluminum such as dimethyl(phenoxy)aluminum, dimethyl(2,6-diisopropylphenoxy)aluminum and dimethyl(2,6-diphenylphenoxy)aluminum.

Among them, preferred is a trialkylaluminum, further preferred is trimethylaluminum, triethylaluminum, tri-n-butylaluminum, triisobutylaluminum or tri-n-hexylaluminum, and particularly preferred is triisobutylaluminum or tri-n-hexylaluminum.

The above-mentioned organoaluminum compounds are used solely, or in combination of two or more thereof.

When using the component (A) as a catalyst component for addition polymerization, an each amount of the components (A) and (B) used in a process for producing a catalyst for addition polymerization of the present invention is not particularly limited. A molar amount of a metal atom contained in the component (A) used therein is generally 1 to 10000 mol, preferably 1 to 100 mol, and further preferably 1 to 10 mol, per 1 mol of a metal atom contained in the component (B) used therein. When using the component (C), a molar amount of an aluminum atom contained in the component (C) used therein is generally 1 to 10000 mol, preferably 10 to 1000 mol, and further preferably 100 to 500 mol, per 1 mol of a metal atom contained in the component (B) used therein.

Examples of a method for contacting the component (A), the component (B) and the optional component (C) in a process for producing a catalyst for addition polymerization of the present invention are (1) a method comprising the steps of contacting all the components (A), (B) and (C) in any order to form a catalyst, and then, feeding the catalyst to a polymerization reactor, (2) a method comprising the step of feeding the components (A), (B) and (C) separately to a polymerization reactor in order to form a catalyst therein, and (3) a method comprising the steps of contacting any two components of the components (A), (B) and (C) to form a contact product, and then, feeding the contact product and the remaining component separately to a polymerization reactor in order to form a catalyst therein.

Examples of an addition polymerizable monomer in a process for producing an addition polymer in accordance with the present invention are an olefin, a diolefin, a cyclic olefin, an alkenyl aromatic hydrocarbon and a polar monomer. Those monomers are used singly, or in combination of two or more thereof.

Examples of the above-mentioned addition polymerizable monomer are:

(1) an olefin such as ethylene, propylene, 1-butene, 1-pentene, 4-methyl-1-pentene, 5-methyl-1-hexene, 1-hexene, 1-heptene, 1-octene, 1-nonene, 1-decene and vinylcyclohexane;

(2) a diolefin such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, norbornadiene, 5-methylene-2-norbornene, 1,5-cyclooctadiene, 5,8-endomethylenehexahydronaphthalene, 1,3-butadiene, isoprene, 1,3-hexadinene, 1,3-octadiene, 1,3-cyclooctadiene and 1,3-cyclohexadiene;

(3) a cyclic olefin such as norbornene, 5-methyl-2-norbornene, 5-ethyl-2-norbornene, 5-butyl-2-norbornene, 5-phenyl-2-norbornene, 5-benzyl-2-norbornene, tetracyclododecene, tricyclodecene, tricycloundecene, pentacyclopentadecene, pentacyclohexadecene, 8-methyltetracyclododecene, 8-ethyltetracyclodecene, 5-acetyl-2-norbornene, 5-acetyloxy-2-norbornene, 5-methoxycarbonyl-2-norbornene, 5-ethoxycarbonyl-2-norbornene, 5-methyl-5-methoxycarbonyl-2-norbornene, 5-cyano-2-norbornene, 8-methoxycarbonyltetracyclododecene, 8-methyl-8-tetracyclododecene and 8-cyanotetracyclododecene;

(4) an alkenyl aromatic hydrocarbon such as an alkenylbenzene (for example, styrene, 2-phenylpropylene, 2-phenylbutene and 3-phenylpropylene), an alkylstyrene (for example, p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene and p-sec-butylstyrene), a bisalkenylbenzene (for example, divinylbenzene), and an alkenylnaphthalene (for example, 1-vinylnaphthalene); and (5) a polar monomer such as an α,β-unsaturated carboxylic acid (for example, acrylic acid, methacrylic acid, fumaric acid, maleic anhydride, itaconic acid, itaconic anhydride and bicyclo(2,2,1)-5-heptene-2,3-dicarboxylic acid); a salt of the above-mentioned α,β-unsaturated carboxylic acid with a metal such as sodium, potassium, lithium, zinc, magnesium and calcium; an α,β-unsaturated carboxylic acid ester (for example, methyl acrylate, ethylacrylate, n-propylacrylate, isopropylacrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate); an unsaturated dicarboxylic acid (for example, maleic acid and itaconic acid); a vinyl ester (for example, vinyl acetate, vinyl propionate, vinyl caproate, vinyl caprate, vinyl laurate, vinyl stearate and vinyl trifluoroacetate); an unsaturated carboxylic acid glycidyl ester (for example, glycidyl acrylate, glycidyl methacrylate and monoglycidyl itaconate); and a cyclic ether (for example, ethylene oxide, propylene oxide, 1-hexene oxide, cyclohexene oxide, styrene oxide and tetrahydrofuran).

A catalyst for addition polymerization produced according to the process of the present invention can produce a homopolymer or a copolymer of the above-mentioned respective addition polymerizable monomers. Examples of the copolymer are an ethylene-propylene copolymer, an ethylene-1-butene copolymer, an ethylene-1-hexene copolymer, and a propylene-1-butene copolymer, A catalyst for addition polymerization produced by the process of the present invention is particularly suitable for a catalyst for producing an olefin polymer. The olefin polymer is particularly preferably a copolymer of ethylene with an α-olefin. Among them, preferred is a copolymer of ethylene with an α-olefin having a polyethylene crystal structure. The α-olefin has preferably 3 to 8 carbon atoms, and examples thereof are propylene, 1-butene, 1-hexene and 1-octene.

A method for addition polymerizing in the process for producing an addition polymer of the present invention is not limited. Examples thereof are (1) a solution or slurry polymerization method using, as a solvent, an aliphatic hydrocarbon (for example, butane, pentane, hexane, heptane and octane), an aromatic hydrocarbon (for example, benzene and toluene) or a halogenated hydrocarbon (for example, methylene dichloride); (2) a bulk polymerization method, wherein polymerization is carried out in a liquid monomer; (3) a gas phase polymerization method, wherein polymerization is carried out in a gaseous monomer; and (4) a high-pressure polymerization method, wherein polymerization is carried out in a supercritical liquid condition at a high temperature under a high pressure. Said polymerization is carried out in a batch-wise method or a continuous method. Also, said polymerization may be carried out in two or more steps, whose polymerization-reaction conditions are different from one another.

A method for feeding the components (A), (B) and (C) to a polymerization reactor is not particularly limited. Examples thereof are (1) a method comprising the step of feeding them thereto in a solid state; and (2) a method comprising the step of feeding them thereto in a solution, suspension or slurry state. A solvent used in the method (2) is preferably a hydrocarbon solvent completely free from a component (for example, moisture and oxygen) deactivating a catalyst. Examples of the solvent are an aliphatic hydrocarbon such as butane, pentane, hexane, heptane and octane; an aromatic hydrocarbon such as benzene and toluene); and a halogenated hydrocarbon such as methylene dichloride, which are the same as those exemplified in the above-mentioned solution or slurry polymerization method.

In a solution, suspension or slurry state of the above-mentioned method (2), a concentration of each of the components (A) and (B) is usually 0.0001 to 100 mmol/liter, and preferably 0.01 to 10 mmol/liter, in terms of a concentration of a metal atom contained in each of the components (A) and (B). A concentration of the component (C) is usually 0.0001 to 100 mol/liter, and preferably 0.01 to 10 mol/liter, in terms of a metal atom contained in the component (C).

A polymerization temperature in the process for producing an addition polymer of the present invention is usually −100 to 350° C., preferably −20 to 300° C., and more preferably 20 to 300° C. A polymerization pressure is usually 0.1 to 350 MPa, preferably 0.1 to 300 MPa, and more preferably 0.1 to 200 MPa. A polymerization time is appropriately determined according to the kind of an addition polymer produced, and a polymerization reactor, and it is usually 1 minute to 20 hours. In order to control a molecular weight of an addition polymer produced, a chain transfer agent such as hydrogen may be added to a polymerization reactor.

EXAMPLE

The present invention is explained in more detail with reference to the following Examples, but the present invention is not limited thereto.

Example 1

(1) Production of Contact Product

Into a 100 ml four-necked flask purged with argon, 90.2 mg (0.105 mol) of cobalt hexadecafluorophthalocyanine, 20 ml of tetrahydrofuran, 55.1 mg (0.103 mmol) of methyldioctadecylamine, and 10 ml of tetrahydrofuran, which was used to wash down methyldioctadecylamine adhereing to a wall of the flask, were put. A reaction in the obtained mixture was carried out by the steps of (i) refluxing for 9 hours, (ii) allowing to stand at a room temperature for 14 hours, (iii) refluxing for 9 hours, (iv) allowing to stand at a room temperature for 14 hours, and (v) refluxing for 6 hours. Tetrahydrofuran (solvent) contained in the obtained reaction mixture was removed by distillation under a reduced pressure at a room temperature, thereby obtaining a contact product.

(2) Polymerization of Olefin

Into a 400 ml-volume autoclave equipped with a stirrer, which had been vacuum dried, and then purged with argon, 190 ml of n-hexane (solvent) and 10 ml of 1-hexene (comonomer) were put, and then, the resultant mixture was heated to 70° C. Ethylene was fed thereto so as to obtain its partial pressure of 0.6 MPa, and the system was stabilized. To the mixture, there were added a toluene solution (concentration=1 mmol/ml) of 0.25 mmol of triisobutylaluminum, a toluene solution (concentration=2 μmol/ml) of 0.2 μmol of ethylenebis(indenyl)zirconium dichloride, and a toluene suspension (concentration=0.23 μmol-Co/ml) of 0.6 μmol of the contact product produced in the above Example 1 (1), in this order. Polymerization was carried out at 70° C. for 30 minutes, thereby obtaining 7.46 g of an ethylene-1-hexene copolymer.

A polymerization activity per mol of a zirconium atom was $7.5 \times 10^7$ g/mol-Zr/hour, and that per mol of a cobalt atom was $2.5 \times 10^7$ g/mol-Co/hour.

Results are summarized in Table 2.

Example 2

(1) Production of Contact Product

Into a 50 ml four-necked flask purged with argon, 93.4 mg (0.109 mmol) of cobalt hexadecafluorophthalocyanine, 29.8 mg (0.0556 mmol) of methyldioctadecylamine, 3.7 mg (0.0544 mmol) of imidazole, and 30 ml of tetrahydrofuran were put. The obtained mixture was refluxed under stirring for 24 hours, thereby obtaining a reaction mixture. Tetrahydrofuran (solvent) contained in the reaction mixture was removed by distillation under a reduced pressure at a room temperature, thereby obtaining a contact product.

(2) Polymerization of Olefin

Example 1 (2) was repeated except that the toluene suspension of the contact product was changed to a toluene suspension (concentration=3.6 μmol-Co/ml) of 0.6 μmol of the contact product produced in the above Example 2 (1), thereby obtaining 3.62 g of an ethylene-1-hexene copolymer.

A polymerization activity per mol of a zirconium atom was $3.6 \times 10^7$ g/mol-Zr/hour, and that per mol of a cobalt atom was $6.0 \times 10^6$ g/mol-Co/hour.

Results are summarized in Table 2.

Example 3

Example 1 (2) was repeated except that the toluene suspension of the contact product was changed to a toluene suspension (concentration=3.6 μmol-Co/ml) of 0.2 μmol of the contact product produced in the above Example 2 (1), thereby obtaining 1.29 g of an ethylene-1-hexene copolymer.

39

A polymerization activity per mol of a zirconium atom was $1.3 \times 10^7$ g/mol-Zr/hour, and that per mol of a cobalt atom was $6.5 \times 10^6$ g/mol-Co/hour.

Results are summarized in Table 2.

Example 4

Example 1 (2) was repeated except that (i) the toluene solution (concentration=2 μmol/ml) of 0.2 μmol of ethylenebis(indenyl)zirconium dichloride was changed to a toluene solution (concentration=2 μmol/ml) of 1.0 μmol thereof, and (ii) the toluene suspension of the contact product was changed to a toluene suspension (concentration=3.6 μmol-Co/ml) of 9.9 μmol of the contact product produced in the above Example 2 (1), thereby obtaining 16.1 g of an ethylene-1-hexene copolymer.

A polymerization activity per mol of a zirconium atom was $3.2 \times 10^7$ g/mol-Zr/hour, and that per mol of a cobalt atom was $1.6 \times 10^6$ g/mol-Co/hour. A weight average molecular weight (Mw) of the copolymer was 69,000; a ratio of Mw to a number average molecular weight (Mn) thereof, namely, a molecular weight distribution (Mw/Mn) thereof was 1.9; and a short chain branch number (SCB) thereof was 27.0.

Results are summarized in Table 2.

The above-mentioned and below-mentioned Mw, Mn and Mw/Mn were determined under the below-mentioned conditions according to a gel permeation chromatography (GPC). A calibration curve was prepared using standard polystyrenes. Molecular weight distribution (Mw/Mn) was evaluated by a ratio of a weight average molecular weight (Mw) to a number average molecular weight (Mn):

(1) equipment: 150C type, manufactured by Milipore Waters Co., Ltd.;

(2) column: TSK-GEL GMH-HT, 7.5×600×2 columns, manufactured by Tosoh Company;

(3) measurement temperature: 140° C., (4) solvent: o-dichlorobenzene, and (5) measurement concentration: 5 mg/5 ml.

The above-mentioned and below-mentioned SCB was obtained, according to a measurement method and a calculation method mentioned in Die Makromoleculare Chemie, 177, 449 (1976) McRae, M. A., Madams, W. F., by a method comprising the steps of:

(1) measuring an infrared absorption spectrum of the obtained copolymer with an infrared spectrophotometer, FT-IR 7300, manufactured by Japan Spectroscopic Co., Ltd.;

(2) determining an amount of of a 1-hexene unit contained in the copolymer from characteristic absorptions of a 1-hexene unit in the infrared absorption spectrum, using a calibration curve prepared in advance; and (3) determining a short chain branch number (SCB) per 1000 carbon atoms in the copolymer, from the amount of a 1-hexene unit determined above.

Example 5

Example 1 (2) was repeated except that (i) the toluene solution (concentration=2 μmol/ml) of 0.2 μmol of ethylenebis(indenyl)zirconium dichloride was changed to a toluene solution (concentration=2 μmol/ml) of 1.0 μmol thereof, and (ii) the toluene suspension of the contact product was changed to a toluene suspension (concentration=3.6 μmol-Co/ml) of 3.0 μmol of the contact product produced in the above Example 2 (1), thereby obtaining 19.9 g of an ethylene-1-hexene copolymer.

40

A polymerization activity per mol of a zirconium atom was $4.0 \times 10^7$ g/mol-Zr/hour, and that per mol of a cobalt atom was $6.6 \times 10^6$ g/mol-Co/hour. Mw of the copolymer was 59,000; Mw/Mn thererof was 1.9; and SCB thereof was 35.9.

Results are summarized in Table 2.

Example 6

Example 1 (2) was repeated except that (i) the toluene solution (concentration=2 μmol/ml) of 0.2 μmol of ethylenebis(indenyl)zirconium dichloride was changed to a toluene solution (concentration=2 μmol/ml) of 1.0 μmol of bis(n-butylcyclopentadienyl)zirconium dichloride, and (ii) the toluene suspension of the contact product was changed to a toluene suspension (concentration=3.6 μmol-Co/ml) of 3.0 μmol of the contact product produced in the above Example 2 (1), thereby obtaining 5.74 g of an ethylene-1-hexene copolymer.

A polymerization activity per mol of a zirconium atom was $1.1 \times 10^7$ g/mol-Zr/hour, and that per mol of a cobalt atom was $1.9 \times 10^6$ g/mol-Co/hour. Mw of the copolymer was 140,000; Mw/Mn thererof was 2.1; and SCB thereof was 12.2.

Results are summarized in Table 2.

Comparative Example 1

Example 5 was repeated except that the toluene suspension of the contact product was changed to 8.7 μmol of a powder of cobalt hexadecafluorophthalocyanine, thereby obtaining 0.51 g of an ethylene-1-hexene copolymer.

A polymerization activity per mol of a zirconium atom was $1.0 \times 10^6$ g/mol-Zr/hour, and that per mol of a cobalt atom was $5.9 \times 10^4$ g/mol-Co/hour. Mw of the copolymer was 98,000; and Mw/Mn thererof was 2.1.

Results are summarized in Table 2.

Comparative Example 2

Example 2 was repeated except that the toluene suspension of the contact product was changed to 100 μmol of a powder of cobalt hexadecafluorophthalocyanine, thereby obtaining 9.38 g of an ethylene-1-hexene copolymer.

A polymerization activity per mol of a zirconium atom was $9.4 \times 10^7$ g/mol-Zr/hour, and that per mol of a cobalt atom was $9.4 \times 10^4$ g/mol-Co/hour. Mw of the copolymer was 81,000; and Mw/Mn thererof was 2.2.

Results are summarized in Table 2.

TABLE 2

|  | Example | | | | | | Comparative Example | |
|---|---|---|---|---|---|---|---|---|
|  | 1 | 2 | 3 | 4 | 5 | 6 | 1 | 2 |
| Catalyst | | | | | | | | |
| Kind (Note-1) | Cat-1 | Cat-1 | Cat-1 | Cat-1 | Cat-1 | Cat-2 | Cat-1 | Cat-1 |
| Amount (μmol) | 0.2 | 0.2 | 0.2 | 1.0 | 1.0 | 1.0 | 1.0 | 0.2 |
| Co-catalyst | | | | | | | | |
| Kind (Note-2) | Co-1 | Co-2 | Co-2 | Co-2 | Co-2 | Co-2 | Co-3 | Co-3 |
| Amount (μmol) | 0.6 | 0.6 | 0.2 | 9.9 | 3.0 | 3.0 | 8.7 | 100 |
| Yield of copolymer (g) | 7.46 | 3.62 | 1.29 | 16.1 | 19.9 | 5.74 | 0.51 | 9.38 |
| Polymerization | | | | | | | | |

TABLE 2-continued

|  | Example | | | | | | Comparative Example | |
|---|---|---|---|---|---|---|---|---|
|  | 1 | 2 | 3 | 4 | 5 | 6 | 1 | 2 |
| activity × 10$^{-6}$ | | | | | | | | |
| g/mol-Zr/hr | 75 | 36 | 13 | 32 | 40 | 11 | 1.0 | 94 |
| g/mol-Co/hr | 25 | 6.0 | 6.5 | 1.6 | 6.6 | 1.9 | 0.059 | 0.094 |
| Mw × 10$^{-4}$ | — | — | — | 6.9 | 5.9 | 14 | 9.8 | 8.1 |
| Mw/Mn | — | — | — | 1.9 | 1.9 | 2.1 | 2.1 | 2.2 |
| SCB | — | — | — | 27.0 | 35.9 | 12.2 | — | — |

Note-1:
"Cat-1" and "Cat-2" are "ethylenebis(indenyl)zirconium dichloride" and "bis(n-butylcyclopentadienyl)zirconium dichloride", respectively.
Note-2:
"Co-1", "Co-2" and "Co-3" are the "contact product obtained in Example 1 (1)", the "contact product obtained in Example 2 (1)" and "powder of cobalt hexadecafluorophthalocyanine", respectively.
Polymerization conditions:
Polymerization was carried out at 70° C. for 30 minutes, under a partial pressure of ethylene of 0.6 MPa, using 190 ml of n-hexane, 10 ml of 1-hexene, and 0.25 mmol of triisobutylaluminum.

The invention claimed is:

1. A process for producing a catalyst for addition polymerization, which comprises the step of contacting a catalyst component for addition polymerization, a compound of a metal atom of Groups 3 to 12 or the lanthanide series, and an optional organoaluminum compound with one another, wherein the catalyst component for addition polymerization comprises a contact product produced by a process comprising the step of contacting at least a phthalocyanine complex, a porphyrin complex, or their combination with a surfactant.

2. The process for producing a catalyst for addition polymerization according to claim 1, wherein the compound of a metal atom of Groups 3 to 12 or the lanthanide series is a metallocene metal compound.

3. A process for producing an addition polymer, which comprises the step of addition polymerizing an addition polymerizable monomer in the presence of a catalyst for addition polymerization produced by the process according to claim 1.

4. A process for producing a contact product which comprises the step of contacting a complex with a surfactant represented by formula, wherein the complex is a complex represented by the following formula:

$$ZR^1_n \quad [1]$$

wherein Z is a nitrogen atom, an oxygen atom or a sulfur atom: n is the valence of Z: and R$^1$ is a hydrogen atom or a hydrocarbon group, and plural R$^1$s are the same as, or different from one another; and

[3]

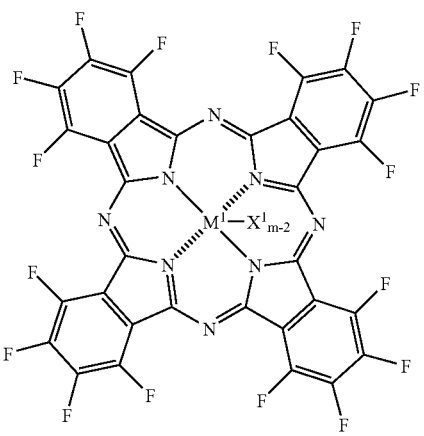

wherein M$^1$ is an atom of Groups 2 to 12 or the lanthanide series of the periodic table; m is the valence of M$^1$; and X$^1$ is a hydrogen atom, a halogen atom, a hydrocarbon group or a hydrocarbyloxy group, and when plural X$^1$s exist, they are the same as, or different from one another.

* * * * *